(12) United States Patent
Seki

(10) Patent No.: US 11,492,782 B2
(45) Date of Patent: Nov. 8, 2022

(54) DISPLAY DEVICE FOR SHOVEL DISPLAYING LEFT AND RIGHT MIRROR IMAGES AND SHOVEL INCLUDING SAME

(71) Applicant: SUMITOMO CONSTRUCTION MACHINERY CO., LTD., Tokyo (JP)

(72) Inventor: Takuma Seki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/015,386

(22) Filed: Sep. 9, 2020

(65) Prior Publication Data

US 2020/0407948 A1 Dec. 31, 2020

Related U.S. Application Data

(63) Continuation of application No. PCT/JP2019/011219, filed on Mar. 18, 2019.

(30) Foreign Application Priority Data

Mar. 20, 2018 (JP) .............................. JP2018-053221

(51) Int. Cl.
*E02F 9/26* (2006.01)
*B60K 35/00* (2006.01)
(Continued)

(52) U.S. Cl.
CPC ................ *E02F 9/26* (2013.01); *B60K 35/00* (2013.01); *B60R 1/00* (2013.01); *E02F 9/16* (2013.01);
(Continued)

(58) Field of Classification Search
CPC ...... B60K 35/00; B60K 2370/31; B60R 1/00; G06K 9/00805; G06T 3/40; G06T 11/001; G06T 11/60; H04N 5/23238; H04N 5/265
See application file for complete search history.

(56) References Cited

U.S. PATENT DOCUMENTS 9,432,634 B2 8/2016 Kiyota
10,145,087 B2 12/2018 Kowatari et al.
(Continued)

FOREIGN PATENT DOCUMENTS

JP H01-123587 5/1989
JP H02-080040 U 6/1990
(Continued)

OTHER PUBLICATIONS

International Search Report for PCT/JP2019/011219 dated Jun. 4, 2019.

*Primary Examiner* — Terrell M Robinson
(74) *Attorney, Agent, or Firm* — IPUSA, PLLC

(57) ABSTRACT

A shovel includes a lower traveling body, an upper turning body turnably mounted on the lower traveling body, a cab installed on the upper turning body, a display device installed in the cab, and image capturing devices attached to the upper turning body. The display device is configured to simultaneously display a left mirror image and a right mirror image generated based on an image captured by at least one of the image capturing devices. The left mirror image is an image corresponding to a mirror image in a left mirror attached to the left front end of the shovel. The right mirror image is an image corresponding to a mirror image in a right mirror attached to the right front end of the shovel.

12 Claims, 14 Drawing Sheets

(51) Int. Cl.
- B60R 1/00 (2022.01)
- E02F 9/16 (2006.01)
- G06T 3/40 (2006.01)
- G06T 11/00 (2006.01)
- G06T 11/60 (2006.01)
- H04N 5/232 (2006.01)
- H04N 5/265 (2006.01)
- G06V 20/58 (2022.01)
- E02F 3/32 (2006.01)

(52) U.S. Cl.
CPC ............. *G06T 3/40* (2013.01); *G06T 11/001* (2013.01); *G06T 11/60* (2013.01); *G06V 20/58* (2022.01); *H04N 5/23238* (2013.01); *H04N 5/265* (2013.01); *B60K 2370/1526* (2019.05); *B60K 2370/1534* (2019.05); *B60K 2370/179* (2019.05); *B60K 2370/31* (2019.05); *B60R 2300/105* (2013.01); *B60R 2300/207* (2013.01); *B60R 2300/303* (2013.01); *B60R 2300/8033* (2013.01); *B60R 2300/8093* (2013.01); *E02F 3/32* (2013.01)

(56) References Cited

U.S. PATENT DOCUMENTS

| | | |
|---|---|---|
| 10,294,635 B2 | 5/2019 | Kurogi et al. |
| 2004/0075544 A1* | 4/2004 | Janssen .................. G08G 1/166 340/435 |
| 2004/0085447 A1 | 5/2004 | Katta et al. |
| 2008/0246843 A1 | 10/2008 | Nagata et al. |
| 2009/0195652 A1* | 8/2009 | Gal .......................... F41G 3/165 348/148 |
| 2013/0182066 A1* | 7/2013 | Ishimoto ................. E02F 9/261 348/38 |
| 2014/0111648 A1* | 4/2014 | Ishimoto .................... B60R 1/00 348/148 |
| 2014/0204215 A1* | 7/2014 | Kriel ...................... G01S 13/931 342/52 |
| 2015/0009329 A1 | 1/2015 | Ishimoto |
| 2015/0175071 A1* | 6/2015 | Ishimoto .................... H04N 7/18 348/148 |

FOREIGN PATENT DOCUMENTS

| | | |
|---|---|---|
| JP | H11-001144 | 1/1999 |
| JP | H11-348659 | 12/1999 |
| JP | 2008-258822 | 10/2008 |
| JP | 4776491 | 9/2011 |
| JP | 2012-109741 | 6/2012 |
| JP | 2016-149803 | 8/2016 |
| JP | 2017-110472 | 6/2017 |
| WO | 2016/013490 | 1/2016 |
| WO | 2016/088151 | 6/2016 |
| WO | WO-2016088151 A1 * | 6/2016 ............... H04N 7/18 |
| WO | 2017/191853 | 11/2017 |

\* cited by examiner

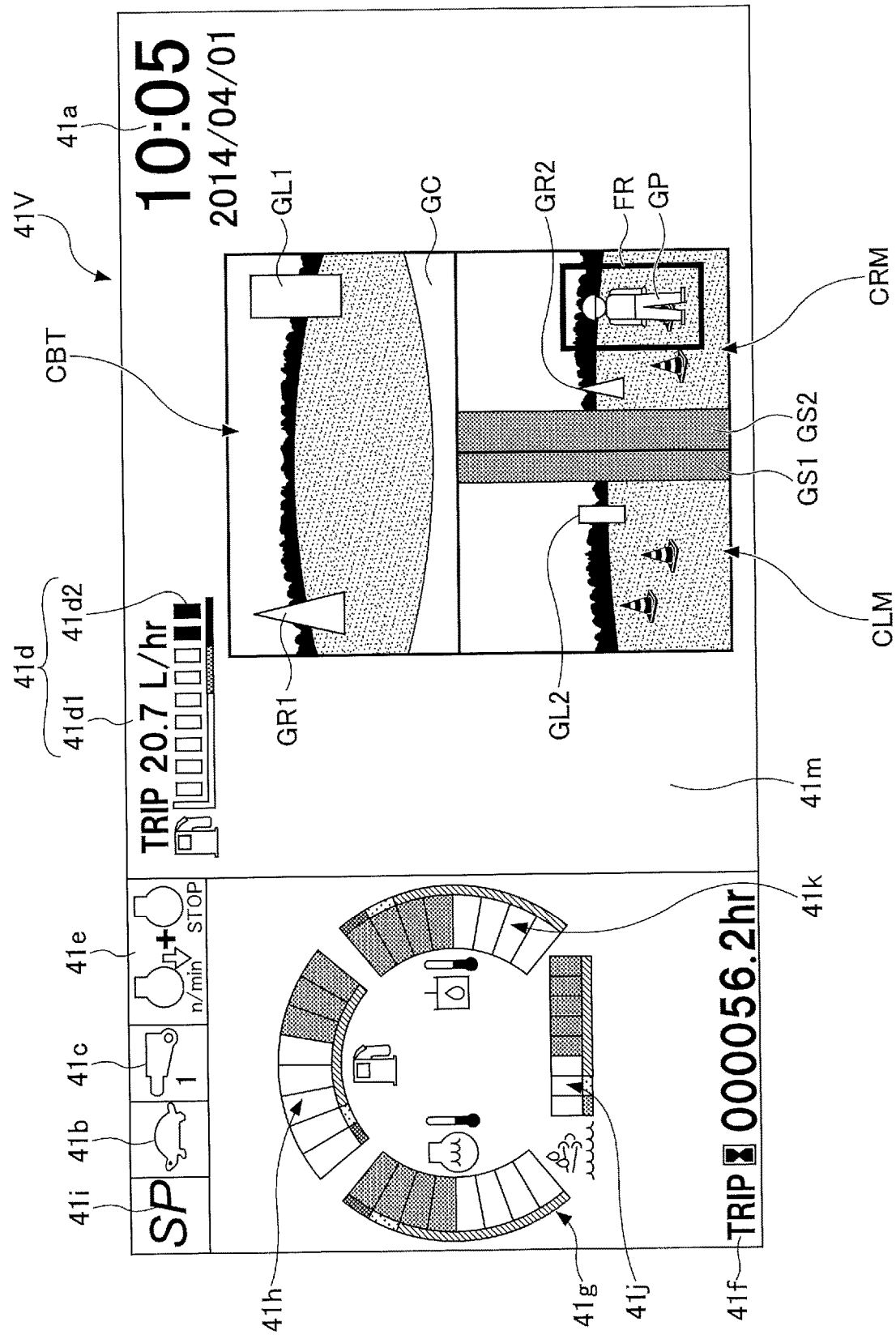

DISPLAY DEVICE FOR SHOVEL DISPLAYING LEFT AND RIGHT MIRROR IMAGES AND SHOVEL INCLUDING SAME

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/011219, filed on Mar. 18, 2019 and designating the U.S., which claims priority to Japanese patent application No. 2018-053221, filed on Mar. 20, 2018. The entire contents of the foregoing applications are incorporated herein by reference.

BACKGROUND

Technical Field

The present disclosure relates to shovels.

Description of Related Art

A shovel provided with a display device that displays an overhead view image in a cab so that an operator can understand the surroundings of the shovel has been known.

SUMMARY

According to an embodiment of the present invention, a shovel includes a lower traveling body, an upper turning body turnably mounted on the lower traveling body, a cab installed on the upper turning body, a display device installed in the cab, and image capturing devices attached to the upper turning body. The display device is configured to simultaneously display a left mirror image and a right mirror image generated based on an image captured by at least one of the image capturing devices. The left mirror image is an image corresponding to a mirror image in a left mirror attached to the left front end of the shovel. The right mirror image is an image corresponding to a mirror image in a right mirror attached to the right front end of the shovel.

BRIEF DESCRIPTION OF THE DRAWINGS

FIG. 9 is a diagram illustrating still another example configuration of the main screen;

DETAILED DESCRIPTION

Such a display device that displays an overhead view image may cause the operator to feel difficulty in determining the distance between the shovel and an object in an area surrounding the shovel, depending on a work site.

Therefore, it is desirable to make it easier for the operator to understand the positional relationship between the shovel and an object in an area surrounding the shovel.

An operator of a shovel according to an embodiment of the present invention can more easily understand the positional relationship between the shovel and an object in an area surrounding the shovel.

Figure 1A:
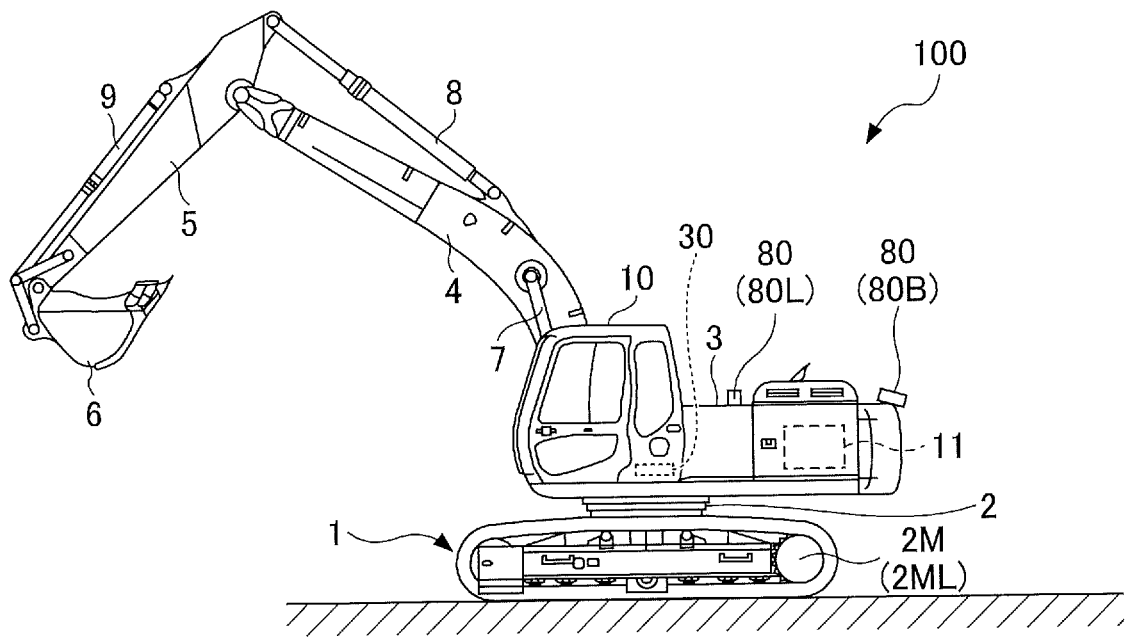
FIG. 1A is a side view of a shovel according to an embodiment of the present invention.
Figure 1B:
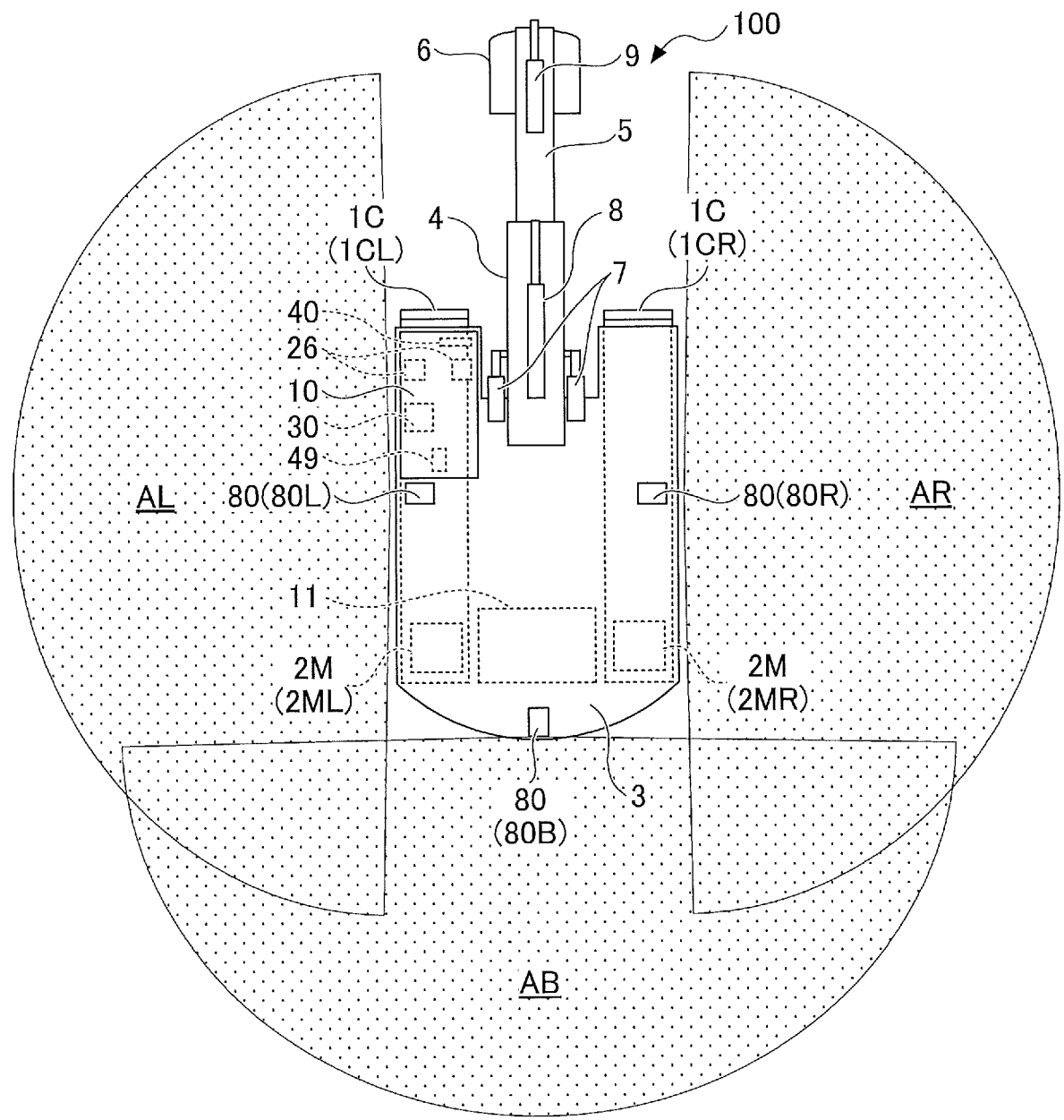
FIG. 1B is a plan view of the shovel illustrated in FIG. 1A.

First, a shovel 100 as an excavator according to an embodiment of the present invention is described with reference to FIGS. 1A and 1B. FIG. 1A is a side view of the shovel 100. FIG. 1B is a plan view of the shovel 100.

According to the example of FIG. 1A, a lower traveling body 1 of the shovel 100 includes a crawler 1C. The crawler 1C is driven by a travel hydraulic motor 2M. Specifically, the crawler 1C includes a left crawler 1CL and a right crawler 1CR, and the travel hydraulic motor 2M includes a left travel hydraulic motor 2ML and a right travel hydraulic motor 2MR. The left crawler 1CL is driven by the left travel hydraulic motor 2ML. The right crawler 1CR is driven by the right travel hydraulic motor 2MR.

An upper turning body 3 is turnably mounted on the lower traveling body 1 via a turning mechanism 2. A boom 4 serving as a work element is attached to the upper turning body 3. An arm 5 serving as a work element is attached to the distal end of the boom 4. A bucket 6 serving as a work element and an end attachment is attached to the distal end of the arm 5. The boom 4 is driven by a boom cylinder 7, the arm 5 is driven by an arm cylinder 8, and the bucket 6 is driven by a bucket cylinder 9. A cabin 10 serving as a cab is provided and a power source such as an engine 11 is mounted on the upper turning body 3. Furthermore, a turning hydraulic motor, a controller 30, an image capturing device 80, etc., are attached to the upper turning body 3. The turning hydraulic motor may alternatively be a turning motor generator.

An operating apparatus 26, a display device 40, an alarm device 49, etc., are provided in the cabin 10. In this specification, for convenience, the side of the upper turning body 3 on which work elements such as the boom 4 are attached is defined as the front side, and the side of the upper turning body 3 on which a counterweight is attached is defined as the back side.

The controller 30 is configured to be able to control the shovel 100. According to the example of FIG. 1A, the controller 30 is constituted of a computer including a CPU, a RAM, an NVRAM, and a ROM. In this case, the controller 30 reads programs corresponding to functions from the ROM, loads the programs into the RAM, and causes the CPU to execute corresponding processes. Elements carrying the functions may also be constituted of hardware or constituted of a combination of software and hardware.

The image capturing device 80 is configured to capture an image of an area surrounding the shovel 100. Examples of the image capturing device 80 include a monocular camera, a stereo camera, a distance image camera, an infrared camera, and a LIDAR. According to the example of FIG. 1A, the image capturing device 80 includes a back camera 80B attached to the back end of the upper surface of the upper turning body 3, a left camera 80L attached to the left end of the upper surface of the upper turning body 3, and a right camera 80R attached to the right end of the upper surface of the upper turning body 3.

The back camera 80B, the left camera 80L, and the right camera 80R are attached to the upper turning body 3 such that their respective optical axes point obliquely downward and their respective imaging ranges include part of the upper turning body 3. Therefore, the imaging range of each of the back camera 80B, the left camera 80L, and the right camera 80R has, for example, an angle of view of approximately 180 degrees in a plan view. In FIG. 1B, an imaging range AB represents an example of the imaging range of the back camera 80B, an imaging range AL represents an example of the imaging range of the left camera 80L, and an imaging range AR represents an example of the imaging range of the right camera 80R.

The image capturing device 80 may also operate as an object detector that detects a predetermined object in a predetermined area around the shovel 100. In this case, the image capturing device 80 may include an image processor. The image processor performs known image processing on an image captured by the image capturing device 80 (input image) to detect an image of a predetermined object included in the input image. In response to detecting an image of the predetermined object, the image capturing device 80 outputs an object detection signal to the controller 30. The predetermined object is, for example, a person, an animal, a vehicle, a machine or the like. The image processor may also be configured to detect a moving body. The image processor may be integrated with the controller 30. The object detector may also be a LIDAR, an ultrasonic sensor, a millimeter wave sensor, a laser radar sensor, an infrared sensor, or the like.

The image capturing device 80 may also be configured to detect information on a relative relationship between the orientation of the upper turning body 3 and the orientation of the lower traveling body 1 (hereinafter also referred to as "orientation-related information"). In this case, the image processor performs known image processing on an image captured by the image capturing device 80 (input image) to detect an image of the lower traveling body included in the input image. For example, the image processor identifies a longitudinal direction of the lower traveling body 1 by detecting an image of the lower traveling body 1 using known image recognition techniques. The image processor then derives an angle formed between the longitudinal axis of the upper turning body 3 and the longitudinal direction of the lower traveling body 1. In particular, the crawler 1C protrudes outward relative to the upper turning body 3. Therefore, the image processor can detect the orientation-related information by detecting an image of the crawler 1C. In this case as well, the image processor may be integrated with the controller 30. Furthermore, when the image capturing device 80 is not used to detect the orientation-related information, an orientation detector 85 (see FIG. 3) may be provided to detect the orientation-related information.

The orientation detector 85 is configured to detect the orientation-related information. For example, the orientation detector 85 may be constituted of a combination of a direction sensor attached to the lower traveling body 1 and a direction sensor attached to the upper turning body 3. The orientation detector 85 may also detect the orientation-related information from the position information of each of GNSS receivers provided one on each of the lower traveling body 1 and the upper turning body 3. Furthermore, according to a configuration where the upper turning body 3 is driven to turn by a turning motor generator, the orientation detector 85 may be constituted of a resolver. The orientation detector 85 may be placed at, for example, a center joint provided in relation to a mechanism that achieves relative rotation between the lower traveling body 1 and the upper turning body 3.

The display device 40 is configured to display information. The display device 40 may be connected to the controller 30 via a communications network such as a CAN or may be connected to the controller 30 via a dedicated line. According to this embodiment, the display device 40 is configured to be able to display an image captured by the image capturing device 80. Specifically, the display device 40 is configured to be able to simultaneously display a left mirror image and a right mirror image that are generated based on an image captured by at least one of the back camera 80B, the left camera 80L, and the right camera 80R. The left mirror image is a virtual viewpoint image corresponding to a mirror image in a left mirror attached to the left front end of the shovel. The right mirror image is a virtual viewpoint image corresponding to a mirror image in a right mirror attached to the right front end of the shovel.

Figure 2A:
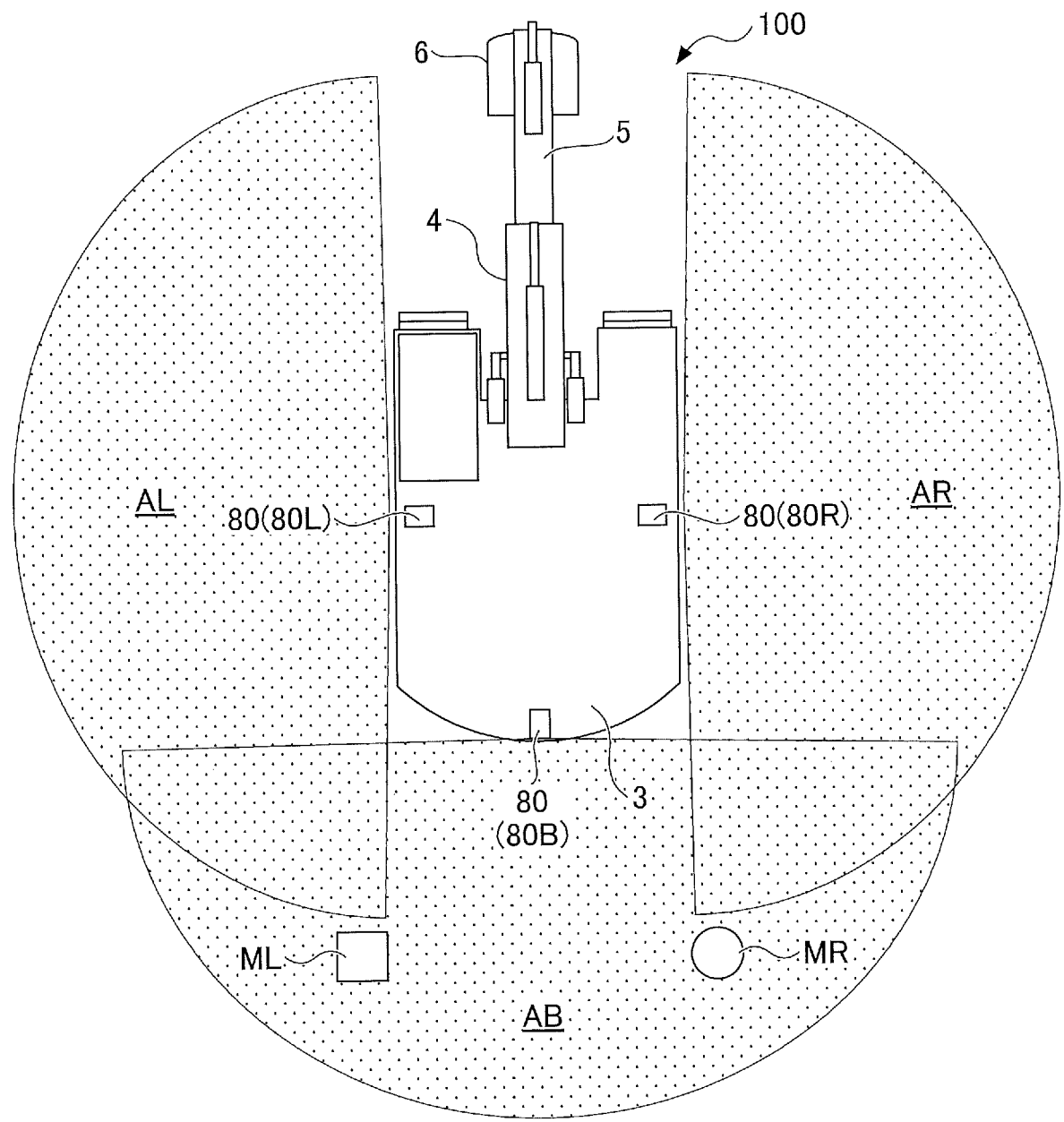
FIG. 2A is a plan view of the shovel illustrated in FIG. 1A.
Figure 2B:
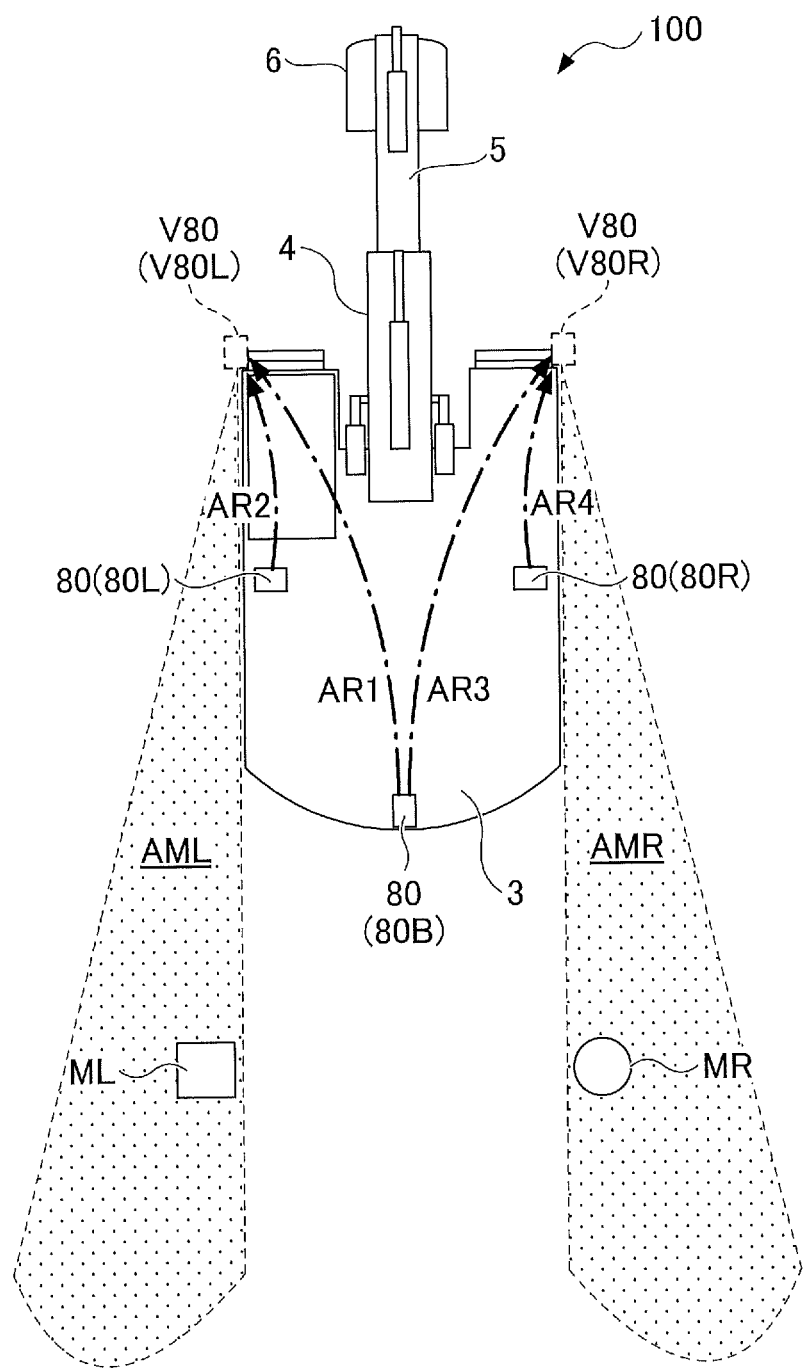
FIG. 2B is a plan view of the shovel illustrated in FIG. 1A.

Here, a mirror image including the left mirror image and the right mirror image is described with reference to FIGS. 2A and 2B. FIG. 2A illustrates the imaging range of the actual image capturing device 80. FIG. 2B illustrates the imaging range of a non-existent virtual image capturing device V80 that virtually captures a mirror image. An object ML, which is an example of an object present in an area surrounding the shovel 100, is a prismatic body of approximately one meter in height, present behind and to the left of the shovel 100. An object MR, which is another example of an object present in an area surrounding the shovel 100, is a conical body of approximately one meter in height, present behind and to the right of the shovel 100.

The virtual image capturing device V80, which is a non-existent virtual device that captures a virtual viewpoint image, is depicted the same as the actual device for convenience of description. According to this embodiment, the virtual image capturing device V80 includes a left mirror camera V80L and a right mirror camera V80R. The left mirror camera V80L, which is a virtual device that captures the left mirror image, is depicted as a device virtually attached to the left front end of the shovel 100 as illustrated in FIG. 2B. Furthermore, the right mirror camera V80R, which is a virtual device that captures the right mirror image, is depicted as a device virtually attached to the right front end of the shovel 100 as illustrated in FIG. 2B.

Specifically, FIG. 2A illustrates that the imaging range AB of the actual back camera 80B is set behind the upper turning body 3, that the imaging range AL of the actual left camera 80L is set to the left of the upper turning body 3, and that the imaging range AR of the actual right camera 80R is set to the right of the upper turning body 3. Furthermore, FIG. 2A illustrates that each of the object ML and the object MR is included in the imaging range AB.

FIG. 2B illustrates that a virtual imaging range AML of the left mirror camera V80L is set to the left of the upper turning body 3 and that a virtual imaging range AMR of the right mirror camera V80R is set to the right of the upper turning body 3. Furthermore, FIG. 2B illustrates that the object ML is included in the virtual imaging range AML and that the object MR is included in the virtual imaging range AMR. As illustrated in FIG. 2B, the virtual imaging range AML forms a shape like a sector of a circle having a center at the left mirror camera V80L, and the virtual imaging range AMR forms a shape like a sector of a circle having a center at the right mirror camera V80R. These sectorial shapes have a central angle of, for example, 20° to 30°.

According to this embodiment, as conceptually illustrated with an arrow AR1 and an arrow AR2 in FIG. 2B, the display device 40 generates the left mirror image based on the respective captured images of the back camera 80B and the left camera 80L. Furthermore, as conceptually illustrated with an arrow AR3 and an arrow AR4 in FIG. 2B, the display device 40 generates the right mirror image based on the respective captured images of the back camera 80B and the right camera 80R. Specifically, the display device 40 generates a mirror image by performing known image processing such as image composition or viewpoint changing on images captured by the image capturing device 80.

When the imaging range AL of the left camera 80L completely includes the virtual imaging range AML of the left mirror camera V80L, however, the display device 40 may generate the left mirror image based only on an image captured by the left camera 80L. Likewise, when the imaging range AR of the right camera 80R completely includes the virtual imaging range AMR of the right mirror camera V80R, the display device 40 may generate the right mirror image based only on an image captured by the right camera 80R.

Figure 3:
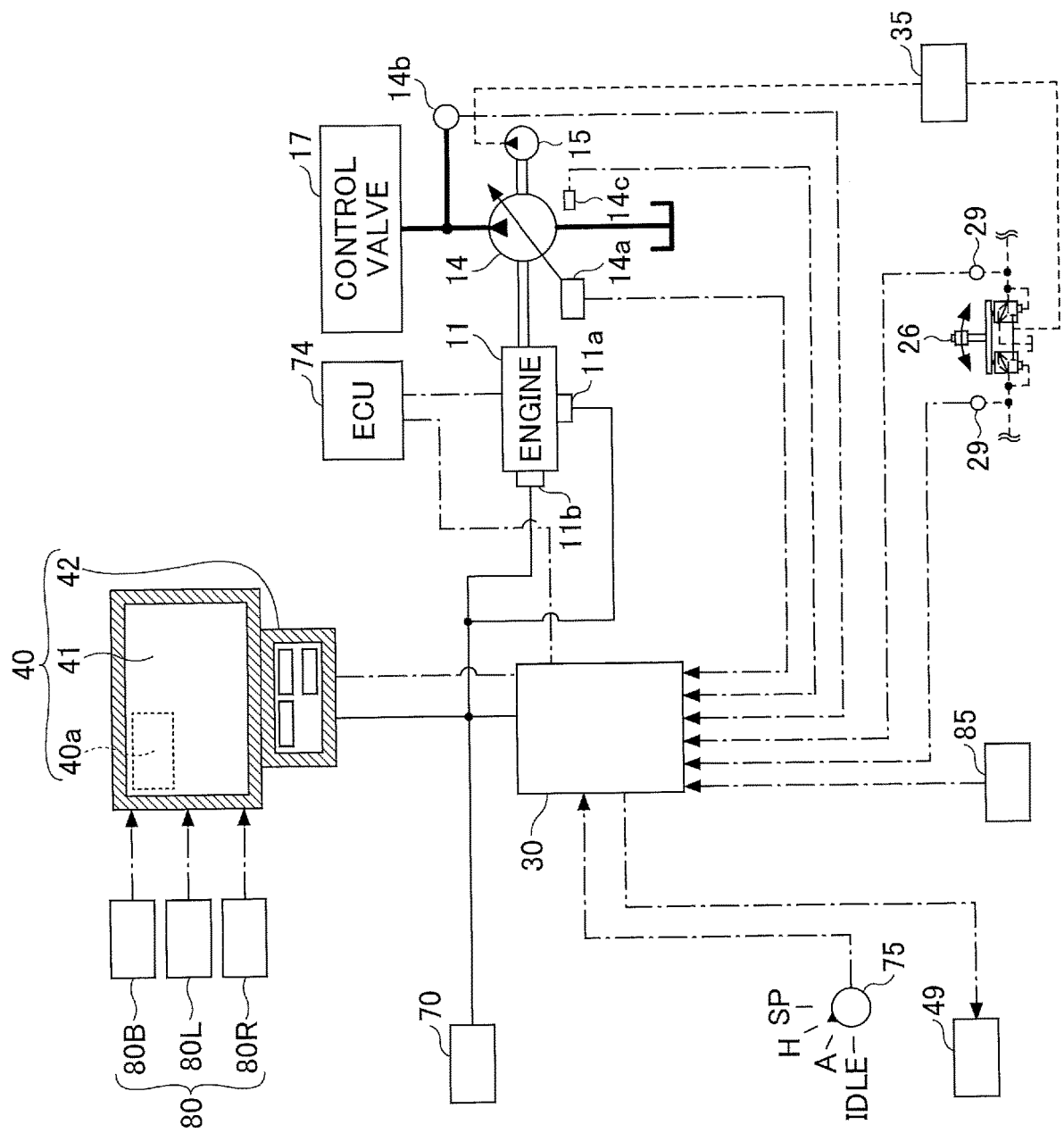
FIG. 3 is a diagram illustrating a basic system installed in the shovel illustrated in FIG. 1A.

Next, a basic system installed in the shovel 100 of FIG. 1A is described with reference to FIG. 3. FIG. 3 illustrates an example configuration of the basic system installed in the shovel 100 of FIG. 1A. In FIG. 3, a mechanical power transmission line, a hydraulic oil line, a pilot line, an electric power line, and an electric control line are indicated by a double line, a thick solid line, a dashed line, a thin solid line, and a one-dot chain line, respectively.

The basic system mainly includes the engine 11, a main pump 14, a pilot pump 15, a control valve 17, the operating apparatus 26, an operating pressure sensor 29, the controller 30, a selector valve 35, the alarm device 49, and an engine rotational speed adjustment dial 75.

The engine 11 is a diesel engine that adopts isochronous control to maintain a constant engine rotational speed irrespective of an increase or decrease in a load. The amount of fuel injection, the timing of fuel injection, boost pressure, etc., in the engine 11 are controlled by an engine control unit (ECU 74).

The engine 11 is connected to each of the main pump 14 and the pilot pump 15 serving as hydraulic pumps. The main pump 14 is connected to the control valve 17 via a hydraulic oil line.

The control valve 17 is a hydraulic control device that controls the hydraulic system of the shovel 100. The control valve 17 is connected to hydraulic actuators such as the left travel hydraulic motor 2ML, the right travel hydraulic motor 2MR, the boom cylinder 7, the arm cylinder 8, the bucket cylinder 9, and the turning hydraulic motor.

Specifically, the control valve 17 includes spool valves corresponding to the hydraulic actuators. Each spool valve is configured to be able to change its position according to a pilot pressure so as to be able to increase and decrease the opening area of a PC port and the opening area of a CT port. The PC port is a port that causes the main pump 14 to communicate with a hydraulic actuator. The CT port is a port that causes a hydraulic actuator to communicate with a hydraulic oil tank.

The pilot pump 15 is connected to the operating apparatus 26 via a pilot line. According to this embodiment, the pilot pump 15 is a fixed displacement hydraulic pump. The pilot pump 15, however, may be omitted. In this case, the function carried by the pilot pump 15 may be implemented by the main pump 14. That is, the main pump 14 may have the function of supplying hydraulic oil to the operating apparatus 26, etc., after reducing the pressure of the hydraulic oil with a throttle or the like, apart from the function of supplying hydraulic oil to the control valve 17.

The operating apparatus 26 includes, for example, a left travel lever, a right travel lever, and a travel operating apparatus. The travel operating apparatus includes, for example, a travel lever and a travel pedal. According to this embodiment, each operating apparatus 26 is a hydraulic operating apparatus and is connected to the pilot ports of a corresponding spool valve in the control valve 17 via a pilot line. The operating apparatus 26 may alternatively be an electrical operating apparatus.

The operating pressure sensor 29 detects the details of the operation of the operating apparatus 26 in the form of pressure. The operating pressure sensor 29 outputs a detection value to the controller 30. The details of the operation of the operating apparatus 26 may also be electrically detected.

The selector valve 35 is configured to be able to switch the enabled state and the disabled state of the operating apparatus 26. The enabled state of the operating apparatus 26 is a state where an operator can operate hydraulic actuators using the operating apparatus 26. The disabled state of the operating apparatus 26 is a state where the operator cannot operate hydraulic actuators using the operating apparatus 26. According to this embodiment, the selector valve 35 is a gate lock valve (solenoid valve) configured to operate in accordance with a command from the controller 30. Specifically, the selector valve 35 is placed in a pilot line connecting the pilot pump 15 and the operating apparatus 26, and is configured to be able to switch the closing and opening of the pilot line in response to a command from the controller 30. For example, the operating apparatus 26 is enabled when a gate lock lever not depicted is pulled up to open the gate lock valve, and is disabled when the gate lock lever is pushed down to close the gate lock valve.

The display device 40 includes a control part 40a, an image display part 41, and a switch panel 42 serving as an input part. The control part 40a is configured to be able to control an image displayed on the image display part 41. According to this embodiment, the control part 40a is constituted of a computer including a CPU, a RAM, an NVRAM, and a ROM. In this case, the control part 40a reads programs corresponding to functions from the ROM, loads the programs into the RAM, and causes the CPU to execute corresponding processes. Elements carrying the functions may also be constituted of hardware or constituted of a combination of software and hardware. An image displayed on the display device 40 may also be controlled by the controller 30 or the image capturing device 80.

The switch panel 42 is a panel including hardware switches. The switch panel 42 may also be a touchscreen. The display device 40 is supplied with electric power from a rechargeable battery 70 to operate. The rechargeable battery 70 is charged with, for example, electricity generated in an alternator 11a. The electric power of the rechargeable battery 70 is also supplied to the controller 30, etc. For example, a starter 1ib of the engine 11 is driven with electric power from the rechargeable battery 70 to start the engine 11.

The ECU 74 transmits data on the condition of the engine 11, such as coolant water temperature, to the controller 30. A regulator 14a of the main pump 14 transmits data on a swash plate tilt angle to the controller 30. A discharge pressure sensor 14b transmits data on the discharge pressure of the main pump 14 to the controller 30. An oil temperature sensor 14c provided in a conduit between the hydraulic oil tank and the main pump 14 transmits data on the temperature of hydraulic oil flowing through the conduit to the controller 30. The operating pressure sensor 29 transmits data on a pilot pressure generated in response to the operation of the operating apparatus 26 to the controller 30. The controller 30 stores these data in a temporary storage part (memory) and can transmit these data to the display device 40 when needed.

The engine rotational speed adjustment dial 75 is a dial for adjusting the rotational speed of the engine 11. The engine rotational speed adjustment dial 75 transmits data on the setting of the engine rotational speed to the controller 30. The engine rotational speed adjustment dial 75 is configured to allow the engine rotational speed to be selected from among the four levels of SP mode, H mode, A mode, and idling mode. The SP mode is a rotational speed mode selected when the operator desires to prioritize workload, and uses the highest engine rotational speed. The H mode is a rotational speed mode selected when the operator desires to balance workload and fuel efficiency, and uses the second highest engine rotational speed. The A mode is a rotational speed mode selected when the operator desires to operate the shovel at low noise while prioritizing fuel efficiency, and uses the third highest engine rotational speed. The idling mode is a rotational speed mode selected when the operator desires to idle the engine, and uses the lowest engine rotational speed. The engine 11 is controlled to a constant rotational speed at the engine rotational speed of the rotational speed mode set by the engine rotational speed adjustment dial 75.

The alarm device 49 is a device for calling the attention of a person engaged in the work of the shovel 100. The alarm device 49 is constituted of, for example, a combination of an interior alarm device and an exterior alarm device. The interior alarm device is a device for calling the attention of the operator of the shovel 100 in the cabin 10, and includes, for example, at least one of an audio output device, a vibration generator, and a light emitter provided in the cabin 10. The interior alarm device may also be the display device 40. The exterior alarm device is a device for calling the attention of a worker who works in an area surrounding the shovel 100, and includes, for example, at least one of an audio output device and a light emitter provided outside the cabin 10. An audio output device serving as the exterior alarm device includes, for example, a travel alarm device attached to the bottom surface of the upper turning body 3. Furthermore, the exterior alarm device may also be a light emitter provided on the upper turning body 3. The exterior alarm device may be omitted. For example, when the image capturing device 80 operating as an object detector detects a predetermined object, the alarm device 49 may so notify a person engaged in the work of the shovel 100.

Next, an example configuration of a main screen 41V displayed on the image display part 41 of the display device 40 is described with reference to FIG. 4. The main screen 41V of FIG. 4 is displayed on the image display part 41, for example, when the engine 11 is ON and the gate lock valve serving as the selector valve 35 is open.

Figure 4:
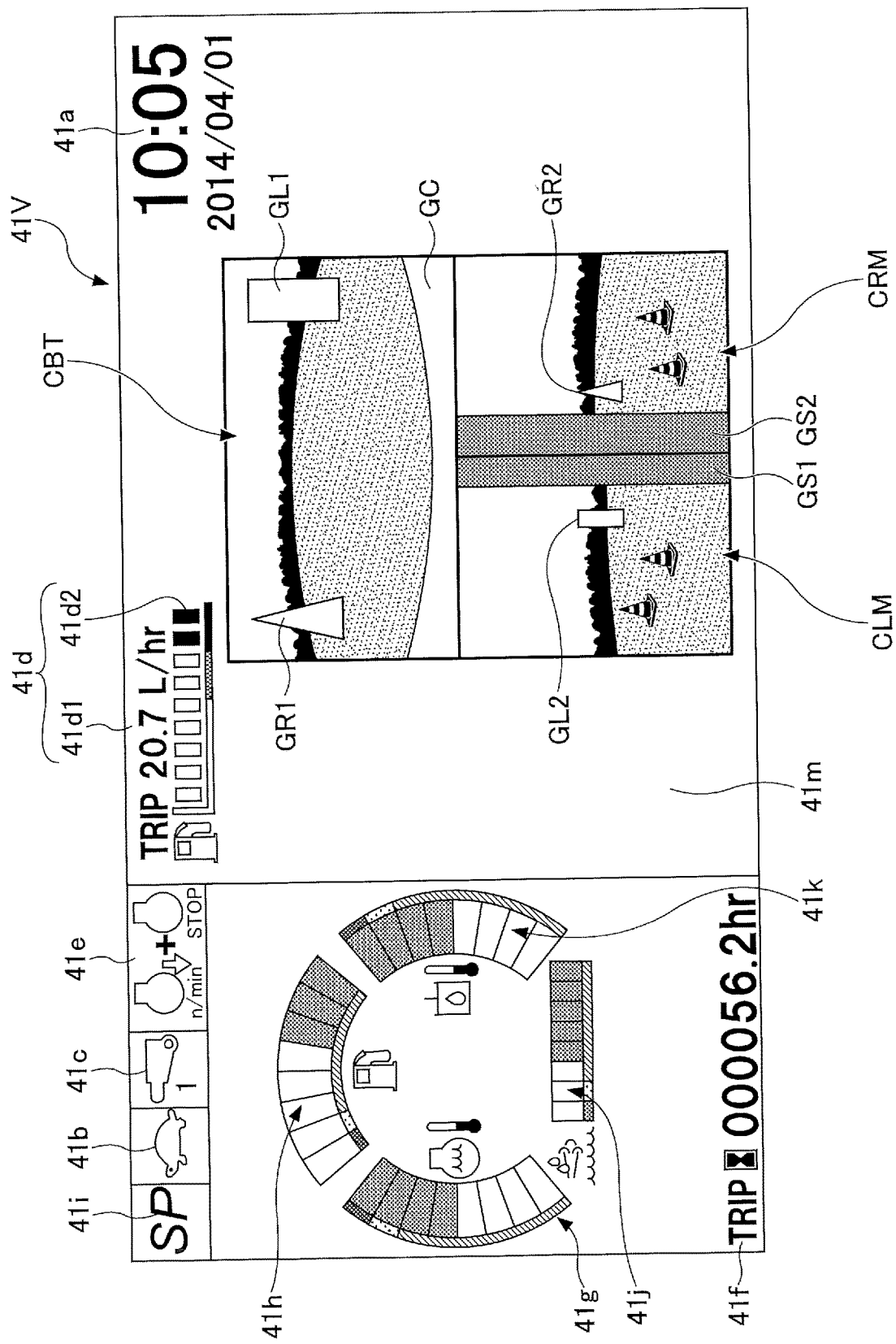
FIG. 4 is a diagram illustrating an example configuration of a main screen.

As illustrated in FIG. 4, the main screen 41V includes a date and time display area 41a, a travel mode display area 41b, an attachment display area 41c, a fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, and an image display area 41m.

The travel mode display area 41b, the attachment display area 41c, the engine control status display area 41e, and the rotational speed mode display area 41i are areas for displaying settings information that is information on the settings of the shovel 100. The fuel efficiency display area 41d, the engine operating time display area 41f, the coolant water temperature display area 41g, the remaining fuel amount display area 41h, the remaining aqueous urea solution amount display area 41j, and the hydraulic oil temperature display area 41k are areas for displaying operating condition information that is information on the operating condition of the shovel 100.

Specifically, the date and time display area 41a is an area for displaying a current date and time. The travel mode display area 41b is an area for displaying a current travel mode. The attachment display area 41c is an area for displaying an image that represents the type of a currently attached attachment. The fuel efficiency display area 41d is an area for displaying fuel efficiency information calculated by the controller 30. The fuel efficiency display area 41d includes an average fuel efficiency display area 41d1 for displaying a lifelong average fuel efficiency or section average fuel efficiency and an instantaneous fuel efficiency display area 41d2 for displaying instantaneous fuel efficiency.

The engine control status display area 41e is an area for displaying the control status of the engine 11. The engine operating time display area 41f is an area for displaying the cumulative operating time of the engine 11. The coolant water temperature display area 41g is an area for displaying a current temperature condition of engine coolant water. The remaining fuel amount display area 41h is an area for displaying the state of the remaining amount of fuel stored in a fuel tank. The rotational speed mode display area 41i is an area for displaying, as an image, a current rotational speed mode set with the engine rotational speed adjustment dial 75. The remaining aqueous urea solution amount display area 41j is an area for displaying, as an image, the state of the remaining amount of an aqueous urea solution stored in an aqueous urea solution tank. The hydraulic oil temperature display area 41k is an area for displaying the state of the temperature of hydraulic oil in the hydraulic oil tank.

The image display area 41m is an area for displaying an image captured by the image capturing device 80. According to the example of FIG. 4, the image display area 41m displays a left mirror image CLM, a right mirror image CRM, and a back camera image CBT. The back camera image CBT is a rearward image showing a space behind the shovel 100 and includes a counterweight image GC.

The left mirror image CLM, the right mirror image CRM, and the back camera image CBT are images generated by the control part 40a of the display device 40. Specifically, the left mirror image CLM is a virtual viewpoint image generated by the control part 40a, and is generated based on images obtained by the back camera 80B and the left camera 80L, respectively. The right mirror image CRM is a virtual viewpoint image generated by the control part 40a, and is generated based on images obtained by the back camera 80B and the right camera 80R, respectively. The back camera image CBT is an actual viewpoint image generated by the control part 40a, and is generated based on an image captured by the back camera 80B.

Furthermore, according to the example of FIG. 4, in the image display area 41m, the left mirror image CLM is disposed at the lower left, the right mirror image CRM is disposed at the lower right, and the back camera image CBT is disposed in the upper middle. In the image display area 41m, however, the left mirror image CLM may be disposed at the upper left, the right mirror image CRM may be disposed at the upper right, and the back camera image CBT may be disposed in the lower middle. Furthermore, the left mirror image CLM and the right mirror image CRM, which are laterally arranged next to each other according to the example of FIG. 4, may be spaced from each other. Furthermore, the back camera image CBT and each of the left mirror image CLM and the right mirror image CRM, which are vertically arranged next to each other, may be spaced from each other.

Furthermore, according to the example of FIG. 4, while the left mirror image CLM and the right mirror image CRM are mirror images, the back camera image CBT is a normal image. Therefore, the back camera image CBT shows an image GL1 of the object ML (see FIGS. 2A and 2B) present behind and to the left of the shovel 100 on the right side and shows an image GR1 of the object MR (see FIGS. 2A and 2B) present behind and to the right of the shovel 100 on the left side. That is, while an image GL2 of the object ML in the left mirror image CLM is displayed to the left of an image GR2 of the object MR in the right mirror image CRM, the image GL1 of the object ML is displayed to the right of the image GR1 of the object MR in the back camera image CBT. Each of the left mirror image CLM and the right mirror image CRM may be placed within a mirror-shaped frame image to cause the operator to intuitively understand that they are mirror images.

Furthermore, according to the example of FIG. 4, the left mirror image CLM includes an image GS1 of a left flank of the upper turning body 3 (the cabin 10) and the right mirror image CRM includes an image GS2 of a right flank of the upper turning body 3, in order to enable the operator to more intuitively understand the positional relationship between the shovel 100 and objects present in an area surrounding the shovel 100.

According to this configuration, the shovel 100 can present a surroundings monitoring image composed of the left mirror image CLM, the right mirror image CRM, and the back camera image CBT (a first surroundings monitoring image) to the operator to cause the operator to easily understand the positional relationship between the shovel 100 and objects present in an area surrounding the shovel 100.

Furthermore, the shovel 100 can display the main screen 41V including the first surroundings monitoring image, the settings information, and the operating condition information on the image display part 41. Therefore, the operator of the shovel 100 can intuitively understand the surroundings of the shovel 100 by looking at the first surroundings monitoring image, while checking various kinds of information displayed on the main screen 41V.

The shovel 100 may display the first surroundings monitoring image in full screen. In this case, the display of the settings information and the operating condition information may be partly or entirely omitted.

Next, another example configuration of the main screen 41V displayed on the image display part 41 of the display device 40 is described with reference to FIG. 5. The main screen 41V of FIG. 5 is displayed on the image display part 41, for example, when the engine 11 is ON and the gate lock valve serving as the selector valve 35 is open.

Figure 5:
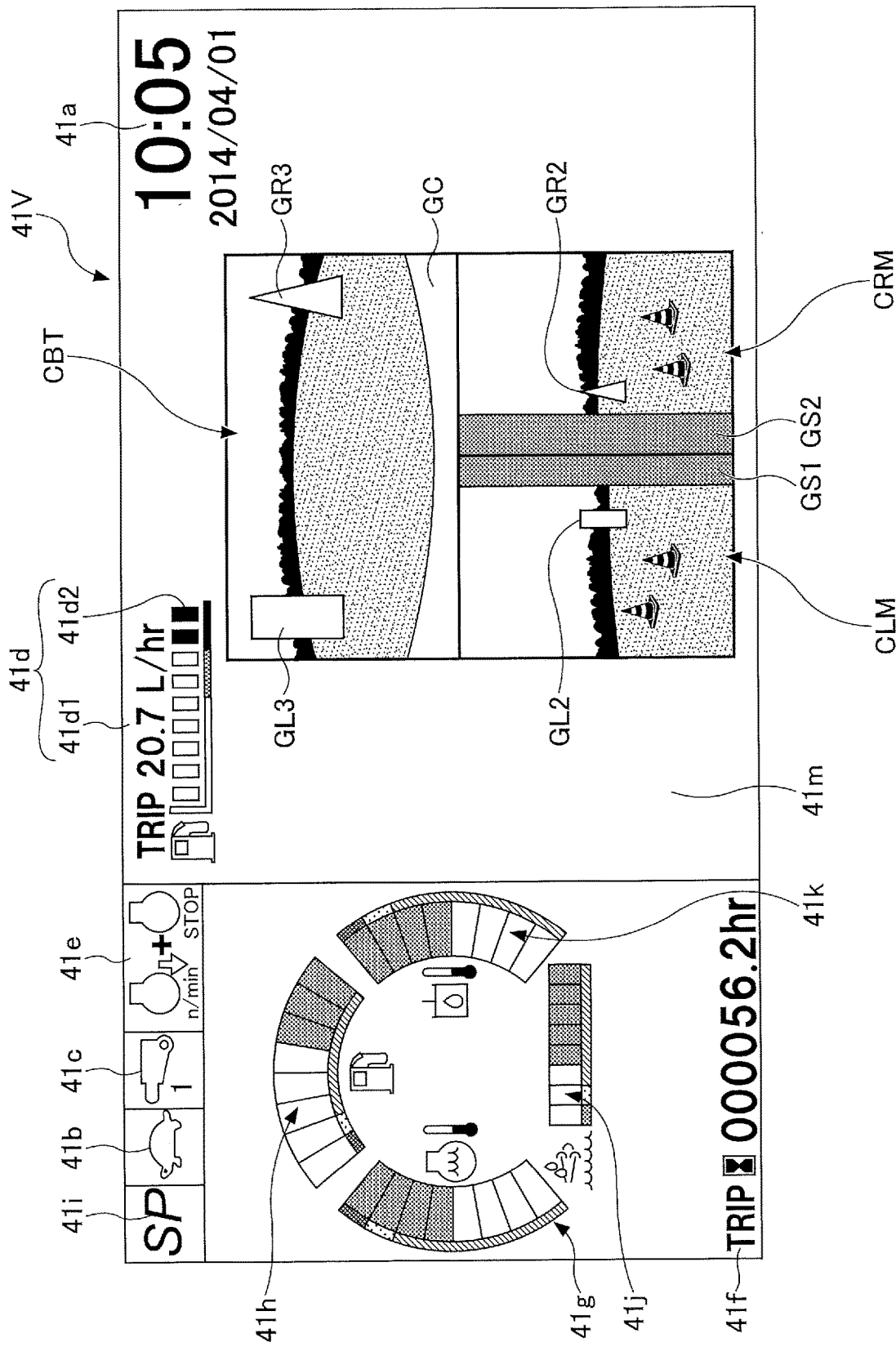
FIG. 5 is a diagram illustrating another example configuration of the main screen.

The main screen 41V of FIG. 5 is different from the main screen 41V of FIG. 4 in that the back camera image CBT is a mirror image from, but otherwise is equal to the main screen 41V of FIG. 4. Therefore, the description of a common portion is omitted, and differences are described in detail.

According to the example of FIG. 5, the back camera image CBT is a mirror image the same as the left mirror image CLM and the right mirror image CRM. Therefore, the back camera image CBT shows an image GL3 of the object ML (see FIGS. 2A and 2B) present behind and to the left of the shovel 100 on the left side and shows an image GR3 of the object MR (see FIGS. 2A and 2B) present behind and to the right of the shovel 100 on the right side. That is, the same as the image GL2 of the object ML in the left mirror image CLM is displayed to the left of the image GR2 of the object MR in the right mirror image CRM, the image GL3 of the object ML is displayed to the left of the image GR3 of the object MR in the back camera image CBT. In this case, as the image GL2 of the object ML in the left mirror image CLM moves leftward, that is, moves away from the shovel 100, the image GL3 of the object ML in the back camera image CBT moves leftward the same as the image GL2. Furthermore, as the image GL2 of the object ML in the left mirror image CLM moves rightward, that is, moves toward the shovel 100, the image GL3 of the object ML in the back camera image CBT moves rightward the same as the image GL2. The same is true for the relationship between the image GR2 of the object MR in the right mirror image CRM and the image GR3 of the object MR in the back camera image CBT. Therefore, the operator can more intuitively understand the positional relationship between the shovel 100 and the object ML and the object MR present in an area surrounding the shovel 100. Each of the left mirror image CLM, the right mirror image CRM, and the back camera image CBT may be placed within a mirror-shaped frame image to cause the operator to intuitively understand that they are mirror images.

Next, yet another example configuration of the main screen 41V displayed on the image display part 41 of the display device 40 is described with reference to FIG. 6. The main screen 41V of FIG. 6 is displayed on the image display part 41, for example, when the engine 11 is ON and the gate lock valve serving as the selector valve 35 is open.

Figure 6:
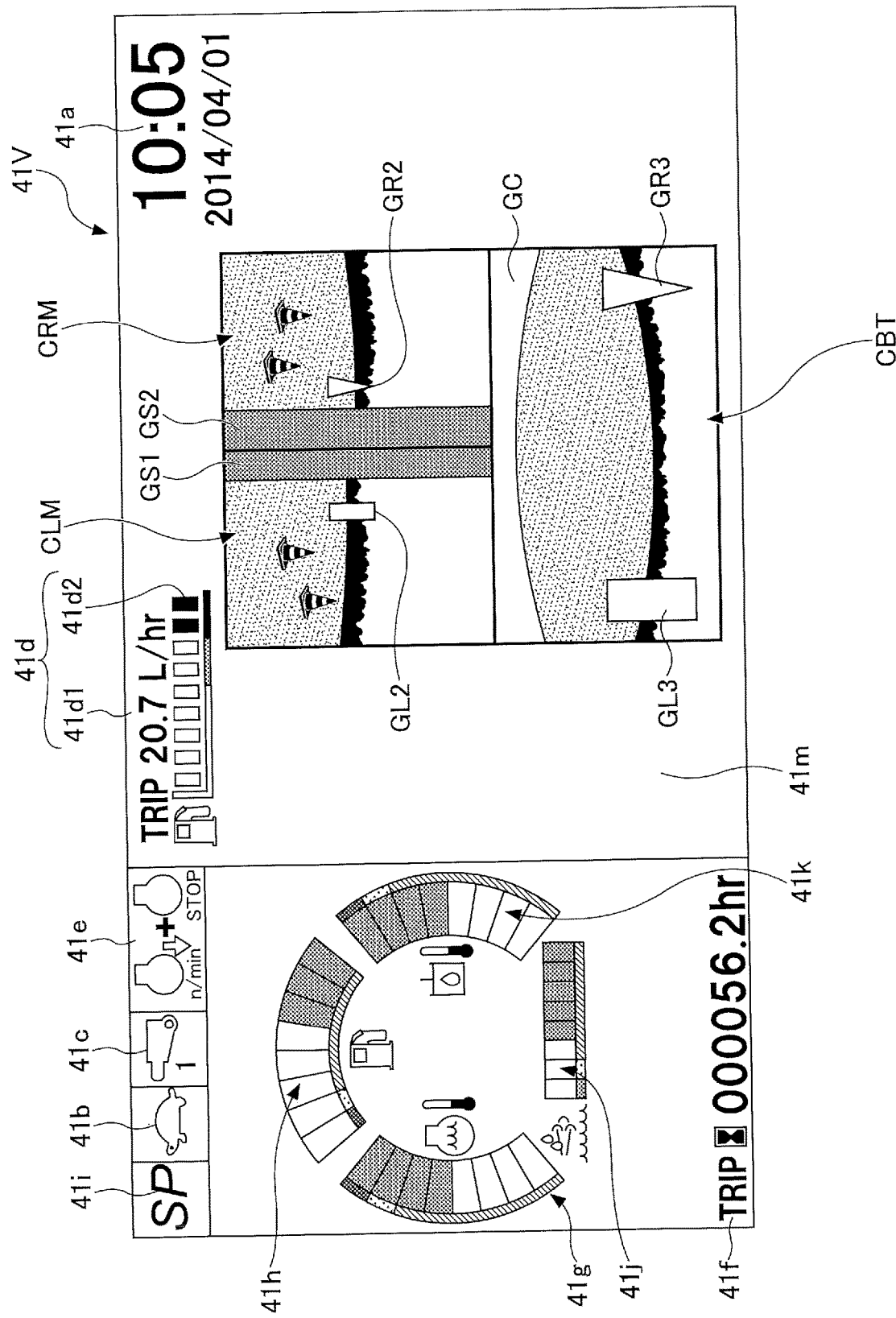
FIG. 6 is a diagram illustrating yet another example configuration of the main screen.

The main screen 41V of FIG. 6 is different from the main screen 41V of FIG. 5 in that the left mirror image CLM, the right mirror image CRM, and the back camera image CBT are flipped upside down and that the left mirror image CLM and the right mirror image CRM are displayed on top of the back camera image CBT, but otherwise is equal to the main screen 41V of FIG. 5.

According to the example of FIG. 6, the back camera image CBT is a mirror image the same as in the case of FIG. 5. Therefore, the back camera image CBT shows the image GL3 of the object ML (see FIGS. 2A and 2B) present behind and to the left of the shovel 100 on the left side and shows the image GR3 of the object MR (see FIGS. 2A and 2B) present behind and to the right of the shovel 100 on the right side. That is, the same as the image GL2 of the object ML in the left mirror image CLM as an image corresponding to a mirror image in the left mirror is displayed to the left of the image GR2 of the object MR in the right mirror image CRM as an image corresponding to a mirror image in the right mirror, the image GL3 of the object ML is displayed to the left of the image GR3 of the object MR in the back camera image CBT. In this case, as the image GL2 of the object ML in the left mirror image CLM moves leftward, that is, moves away from the shovel 100, the image GL3 of the object ML in the back camera image CBT moves leftward the same as the image GL2. Furthermore, as the image GL2 of the object ML in the left mirror image CLM moves rightward, that is, moves toward the shovel 100, the image GL3 of the object ML in the back camera image CBT moves rightward the same as the image GL2. The same is true for the relationship between the image GR2 of the object MR in the right mirror image CRM and the image GR3 of the object MR in the back camera image CBT. Therefore, the operator can more intuitively understand the positional relationship between the shovel 100 and the object ML and the object MR present in an area surrounding the shovel 100. Each of the left mirror image CLM, the right mirror image CRM, and the back camera image CBT may be placed within a mirror-shaped frame image to cause the operator to intuitively understand that they are mirror images. The main screen 41V of FIG. 6 may be composed of a combination of the left mirror image CLM and the right mirror image CRM of FIG. 5, which are not inverted, and the back camera image CBT of FIG. 6, which is inverted.

Figure 7:
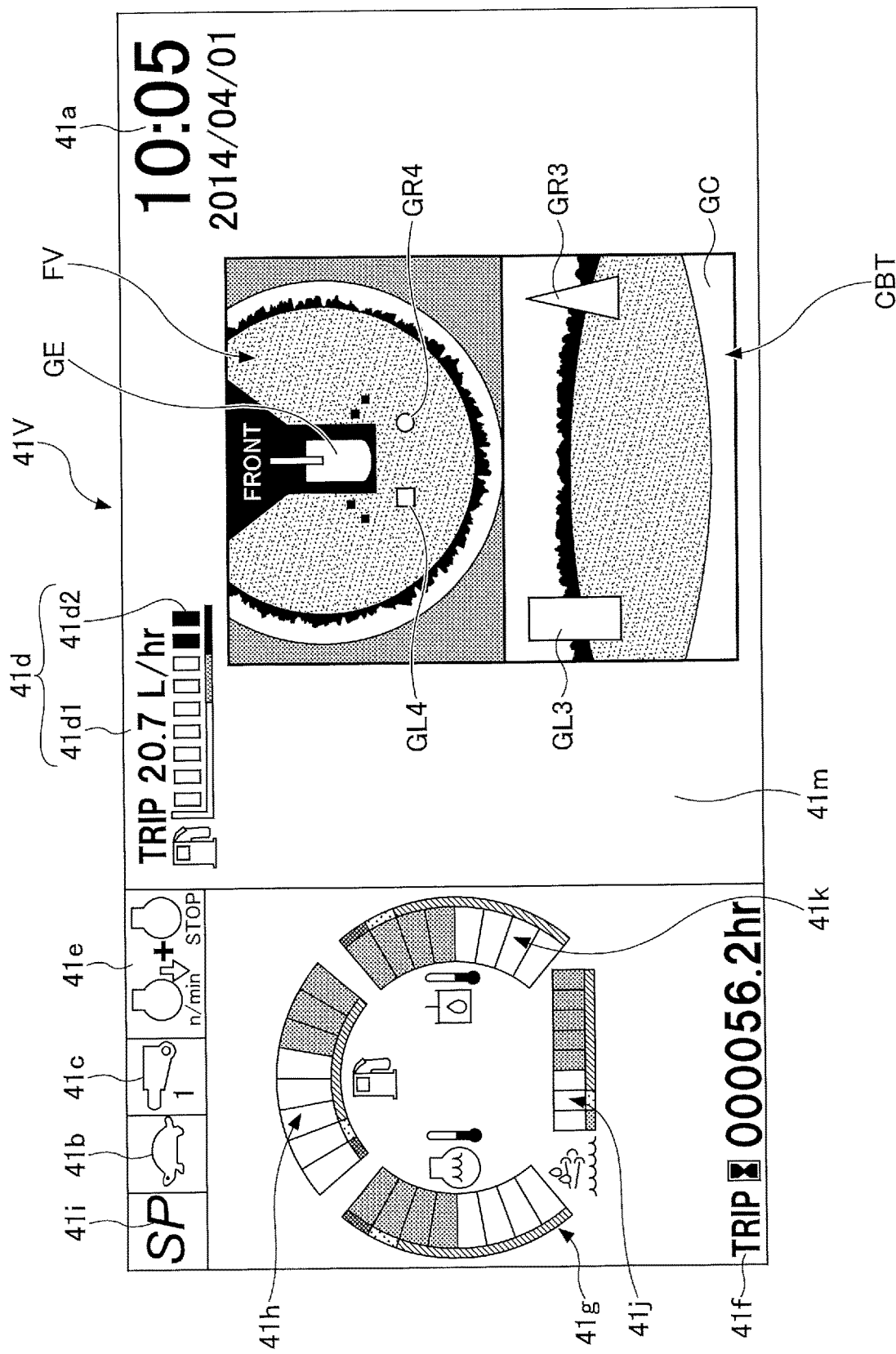
FIG. 7 is a diagram illustrating still another example configuration of the main screen.

Next, still another example configuration of the main screen 41V displayed on the image display part 41 of the display device 40 is described with reference to FIG. 7. The main screen 41V of FIG. 7 is displayed on the image display part 41, for example, when the engine 11 is ON and the gate lock valve serving as the selector valve 35 is closed. By closing the gate lock valve, the operator can switch the main screen 41V of any of FIGS. 4 through 6 displayed on the image display part 41 to the main screen 41V of FIG. 7. Furthermore, by opening the gate lock valve, the operator can switch the main screen 41V of FIG. 7 displayed on the image display part 41 to the main screen 41V of any of FIGS. 4 through 6. The main screen 41V may also be switched through a predetermined switch such as a selector switch installed in the cabin 10.

The main screen 41V of FIG. 7 is different from the main screen 41V of FIG. 4 in displaying a surroundings monitoring image including an overhead view image WV and the back camera image CBT (a second surroundings monitoring image), but otherwise is equal to the main screen 41V of FIG. 4. Therefore, the description of a common portion is omitted, and differences are described in detail.

According to the example of FIG. 7, the overhead view image WV is a virtual viewpoint image generated by the control part 40a, and is generated based images obtained by the back camera 80B, the left camera 80L, and the right camera 80R, respectively. Furthermore, a shovel graphic GE corresponding to the shovel 100 is placed in the middle of the overhead view image WV in order to cause the operator to more intuitively understand the positional relationship between the shovel 100 and objects present in an area surrounding the shovel 100.

According to the example of FIG. 7, in the image display area 41m, the overhead view image WV is placed above and the back camera image CBT is placed below. In the image display area 41m, however, the overhead view image FV may be placed below and the back camera image CBT may be placed above. Furthermore, the overhead view image WV and the back camera image CBT, which are vertically placed next to each other according to the example of FIG. 7, may also be spaced from each other.

Furthermore, according to the example of FIG. 7, the back camera image CBT is a mirror image. Therefore, the back camera image CBT shows the image GL3 of the object ML (see FIGS. 2A and 2B) present behind and to the left of the shovel 100 on the left side and shows the image GR3 of the object MR (see FIGS. 2A and 2B) present behind and to the right of the shovel 100 on the right side. That is, the same as an image GL4 of the object ML in the overhead view image FV is displayed to the left of an image GR4 of the object MR in the overhead view image FV, the image GL3 of the object ML is displayed to the left of the image GR3 of the object MR in the back camera image CBT. In this case, as the image GL4 of the object ML in the overhead view image FV moves leftward, that is, moves away from the shovel 100, the image GL3 of the object ML in the back camera image CBT moves leftward the same as the image GL4. Furthermore, as the image GL4 of the object ML in the overhead view image FV moves rightward, that is, moves toward the shovel 100, the image GL3 of the object ML in the back camera image CBT moves rightward the same as the image GL4. The same is true for the relationship between the image GR4 of the object MR in the overhead view image FV and the image GR3 of the object MR in the back camera image CBT. Therefore, the operator can more intuitively understand the positional relationship between the shovel 100 and the object ML and the object MR present in an area surrounding the shovel 100. The back camera image CBT may be placed within a mirror-shaped frame image to cause the operator to intuitively understand that it is a mirror image.

Figure 8A:
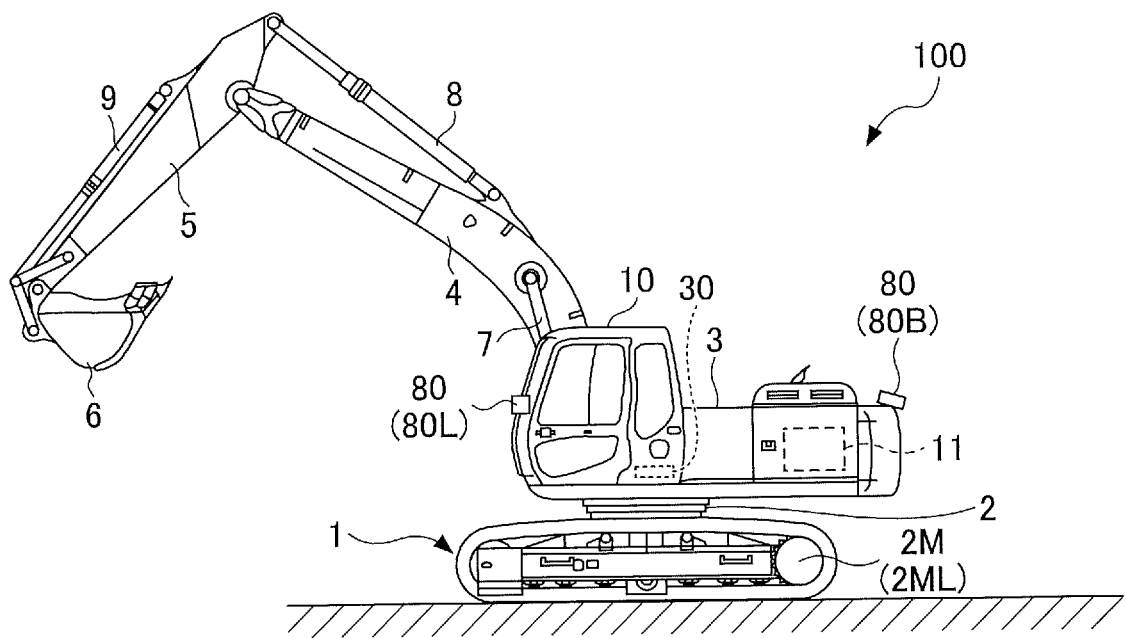
FIG. 8A is a side view of the shovel according to the embodiment of the present invention, illustrating another example configuration.
Figure 8B:
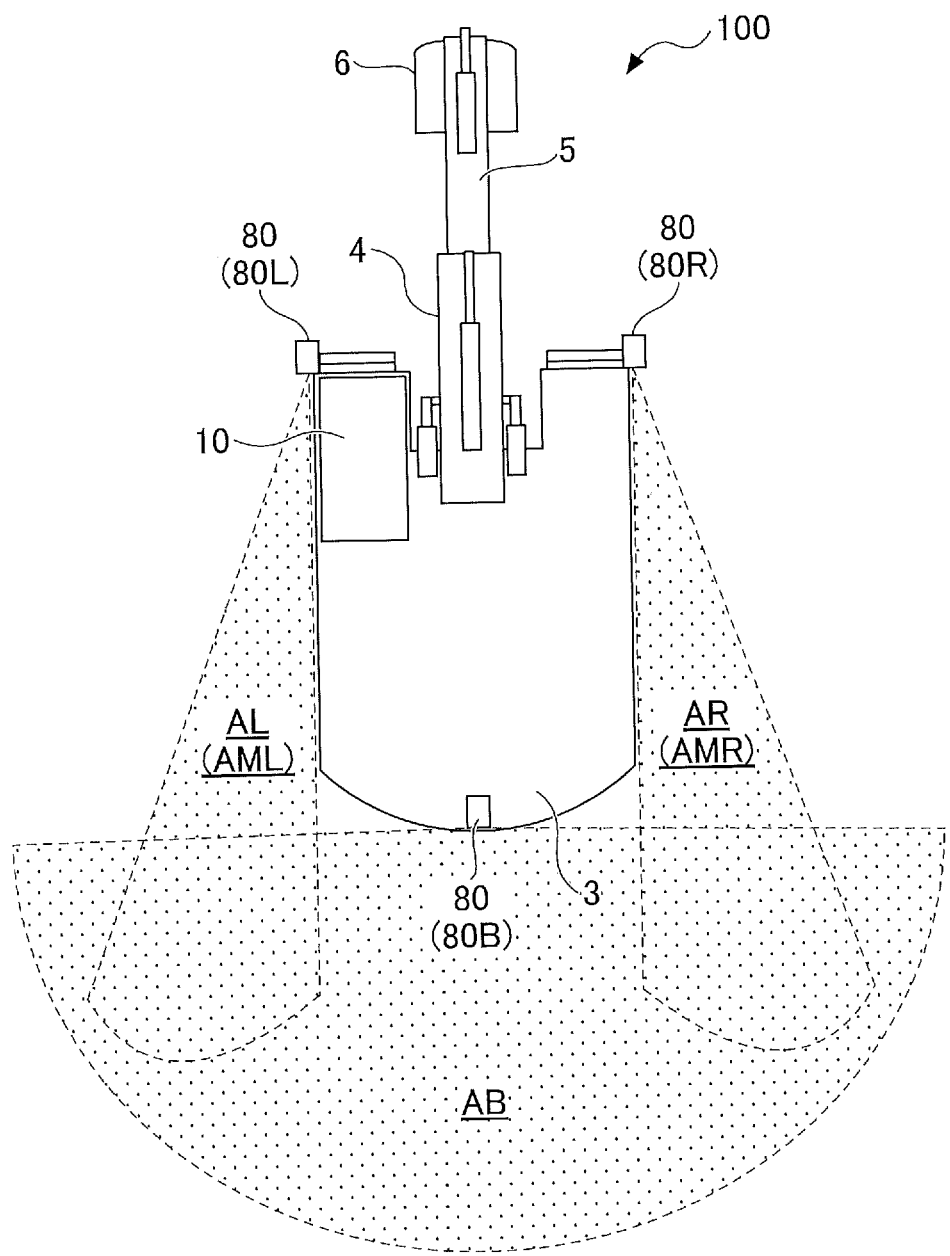
FIG. 8B is a plan view of the shovel illustrated in FIG. 8A, illustrating the other example configuration.

Next, another example configuration of the shovel 100 according to this embodiment is described with reference to FIGS. 8A and 8B. FIG. 8A is a side view of the shovel 100. FIG. 8B is a plan view of the shovel 100. The shovel 100 of FIG. 8A is different in that the left camera 80L is attached to the left front end of the shovel 100 and that the right camera 80R is attached to the right front end of the shovel 100 from, but otherwise equal to, the shovel 100 of FIG. 1A. Therefore, the description of a common portion is omitted, and differences are described in detail.

According to the example of FIG. 8A, the left mirror image captured by the left camera 80L is an actual viewpoint image corresponding to a mirror image in the left mirror attached to the left front end of the shovel 100, and the right mirror image captured by the right camera 80R is an actual viewpoint image corresponding to a mirror image in the right mirror attached to the right front end of the shovel 100. Therefore, FIG. 8B illustrates that the imaging range AL of the left camera 80L corresponds to the virtual imaging range AML of FIG. 2B and that the imaging range AR of the right camera 80R corresponds to the virtual imaging range AMR of FIG. 2B.

According to this embodiment, the display device 40 generates the left mirror image based only on an image captured by the left camera 80L without changing a viewpoint. Likewise, the display device 40 generates the right mirror image based only on an image captured by the right camera 80R without changing a viewpoint. The display device 40 may generate the left mirror image by horizontally flipping an image captured by the left camera 80L and may generate the right mirror image by horizontally flipping an image captured by the right camera 80R.

Furthermore, the display device 40 may generate the overhead view image FV as illustrated in FIG. 7 based on images captured by the back camera 80B, the left camera 80L, and the right camera 80R, respectively. Furthermore, when the imaging range AL of the left camera 80L completely includes the imaging range AL illustrated in FIG. 2A and the imaging range AR of the right camera 80R completely includes the imaging range AR illustrated in FIG. 2A, the display device 40 can generate substantially the same overhead view image as the overhead view image FV illustrated in FIG. 7. Another camera may be attached to the shovel 100 of FIG. 8A so that substantially the same overhead view image as the overhead view image FV illustrated in FIG. 7 can be generated.

According to this configuration, the shovel 100 illustrated in FIG. 8A can achieve the same effects as the shovel 100 illustrated in FIG. 1A. In addition, the shovel 100 illustrated in FIG. 8A can present the left mirror image and the right mirror image as not virtual viewpoint images but actual viewpoint images to the operator, and can therefore cause the operator to more intuitively understand the positional relationship between the shovel 100 and objects present in an area surrounding the shovel 100.

As described above, the shovel 100 according to this embodiment includes the lower traveling body 1, the upper turning body 3 turnably mounted on the lower traveling body 1, the cabin 10 serving as a cab installed on the upper turning body 3, the display device 40 installed in the cabin 10, and the image capturing devices 80 attached to the upper turning body 3. The display device 40 is configured to be able to simultaneously display the left mirror image CLM and the right mirror image CRM, which are generated based on an image captured by at least one of the image capturing devices 80. The left mirror image CLM is an image corresponding to a mirror image in the left mirror attached to the left front end of the shovel 100. The right mirror image CRM is an image corresponding to a mirror image in the right mirror attached to the right front end of the shovel 100. The left front end of the shovel 100 is, for example, the left front end of the cabin 10. A guide rail extending along a pillar of the cabin 10 is typically installed at the left front end of the shovel 100. The right front end of the shovel 100 is, for example, the right front end of a turning frame, and a guide rail extending upward from a tool box is typically installed at the right front end of the shovel 100. The left mirror image CLM may be either a virtual viewpoint image or an actual viewpoint image. The same is true for the right mirror image CRM. Furthermore, at least one of the left mirror and the right mirror does not have to be attached to the upper turning body 3. According to this configuration, the shovel 100 can present the first surroundings monitoring image including the left mirror image CLM and the right mirror image CRM to the operator to cause the operator to easily understand the positional relationship between the shovel 100 and objects present in an area around the shovel 100. As a result, the shovel 100 can improve the work efficiency of a worker. The display device 40 may also be configured to display a surroundings monitoring image including the left mirror image CLM, the right mirror image CRM, and the overhead view image FV.

It may be difficult for the operator of the shovel 100 to understand the positional relationship between, for example, the crawler 1C and a cliff even when the overhead view image FV is presented during work in an area of ground with large variations in elevation, such as slope finishing work. This is because it is difficult for the overhead view image, which is a virtual image viewing the shovel 100 from directly above, to represent the variations in elevation of an area of ground. Furthermore, the overhead view image FV, which is so generated as to be able to present the surroundings of the shovel 100 over a wide area, inevitably includes distortions to differ greatly from a sight that the operator sees with her/his naked eyes. Even in such a case, by presenting the left mirror image CLM and the right mirror image CRM to the operator, the shovel 100 can cause the operator to easily understand the positional relationship between the crawler 1C and the cliff.

The display device 40 may also be configured to be able to simultaneously display the left mirror image CLM, the right mirror image CRM, and the back camera image CBT. According to this configuration, the shovel 100 can present the first surroundings monitoring image including the left mirror image CLM, the right mirror image CRM, and the back camera image CBT to the operator to cause the operator to more easily understand the positional relationship between the shovel 100 and objects present in an area surrounding the shovel 100. The display device 40 may also be configured to display a surroundings monitoring image including the left mirror image CLM, the right mirror image CRM, the back camera image CBT, and the overhead view image FV.

The display device 40 may also be configured to switch between the mode of simultaneously displaying the left mirror image CLM and the right mirror image CRM and the mode of displaying the overhead view image FV as a virtual viewpoint image generated based on multiple images captured by the multiple image capturing devices 80. For example, the display device 40 may present the first surroundings monitoring image including the left mirror image CLM and the right mirror image CRM as illustrated in any of FIGS. 4 through 6 to the operator when the engine 11 is ON and the gate lock valve serving as the selector valve 35 is open. In this case, the presentation of the back camera image CBT may be omitted. Furthermore, the display device 40 may present the second surroundings monitoring image including the overhead view image FV as illustrated in FIG. 7 to the operator when the engine 11 is ON and the gate lock valve serving as the selector valve 35 is closed. In this case, the presentation of the back camera image CBT may be omitted. The display mode may be switched either automatically based on other conditions such as whether an operating lever is being operated or manually using a selector switch or the like. According to this configuration, the shovel 100 can present a surroundings monitoring image in suitable form to the operator at an appropriate time to cause the operator to easily understand the positional relationship between the shovel 100 and objects present in an area surrounding the shovel 100. For example, by switching the first surroundings monitoring image and the second surroundings monitoring image with desired timing, the shovel 100 can present an image suited to a work situation to the operator.

The display device 40 may also be configured to simultaneously display the overhead view image FV and the back camera image CBT as a rearward image. For example, the display device 40 may present the second surroundings monitoring image including the overhead view image FV and the back camera image CBT as illustrated in FIG. 7 to the operator.

The image capturing devices 80 may include, for example, the left camera 80L that is behind the cabin 10 and attached to the left end of the upper turning body 3 and the right camera 80R that is behind the cabin 10 and attached to the right end of the upper turning body 3. In this case, the left mirror image CLM is generated based on, for example, at least an image captured by the left camera 80L and the right mirror image CRM is generated based on, for example, at least an image captured by the right camera 80R.

The image capturing devices 80 may include the back camera 80B that is behind the cabin 10 and attached to the back end of the upper turning body 3. In this case, the left mirror image CLM is generated based on, for example, at least an image captured by the left camera 80L and an image captured by the back camera 80B and the right mirror image CRM is generated based on, for example, at least an image captured by the right camera 80R and an image captured by the back camera 80B.

The image capturing devices 80 may include the left camera 80L attached to the left front end of the shovel 100 and the right camera 80R attached to the right front end of the shovel 100 as illustrated in FIG. 8A.

The display device 40 may also be configured to simultaneously display the left mirror image CLM, the right mirror image CRM, the settings information, and the operating condition information as illustrated in any of FIGS. 4 through 6. The display device 40, however, may omit display of part or the entirety of the settings information and may omit display of part or the entirety of the operating condition information.

Furthermore, the display device 40 may also be provided with such a selector switch as to make it possible to switch the main screens 41V illustrated in FIGS. 4 through 7 as desired. For example, when the main screen 41V illustrated in FIG. 4 is displayed on the display device 40, the operator can switch the main screen 41V to any of the main screens 41V illustrated in FIGS. 5 through 7 by operating, for example, pressing, the selector switch. In this case, the selector switch may be provided on an operating lever.

Furthermore, the shovel 100 may also be configured to be able to detect an object using at least one of the image capturing device 80 (the back camera 80B, the left camera 80L, and the right camera 80R) and the object detector as object detecting means (a LIDAR, a millimeter wave radar, a stereo camera, or the like). In this case, the shovel 100 may display information on an object detected by at least one of the image capturing device 80 and the object detector on the display device 40. Specifically, when an object is detected by at least one of the image capturing device 80 and the object detector, the shovel 100 may display an image that makes it possible to identify the detected object at a position on a displayed image corresponding to the actual position of the detected object. The displayed image is, for example, at least one of the back camera image CBT, the left mirror image CLM, the right mirror image CRM, and the overhead view image FV. For example, when a person is detected behind the shovel 100, the shovel 100 may superimpose and display a particular image (a frame, an icon, or the like) over a position on the displayed image corresponding to the actual position of the detected person. The shovel 100 may change the mode of display of the particular image according to the positional relationship between the shovel 100 and the object. For example, the shovel 100 may change at least one of the color and the light and shade of the particular image according to the distance between the shovel 100 and the object.

Figure 10:
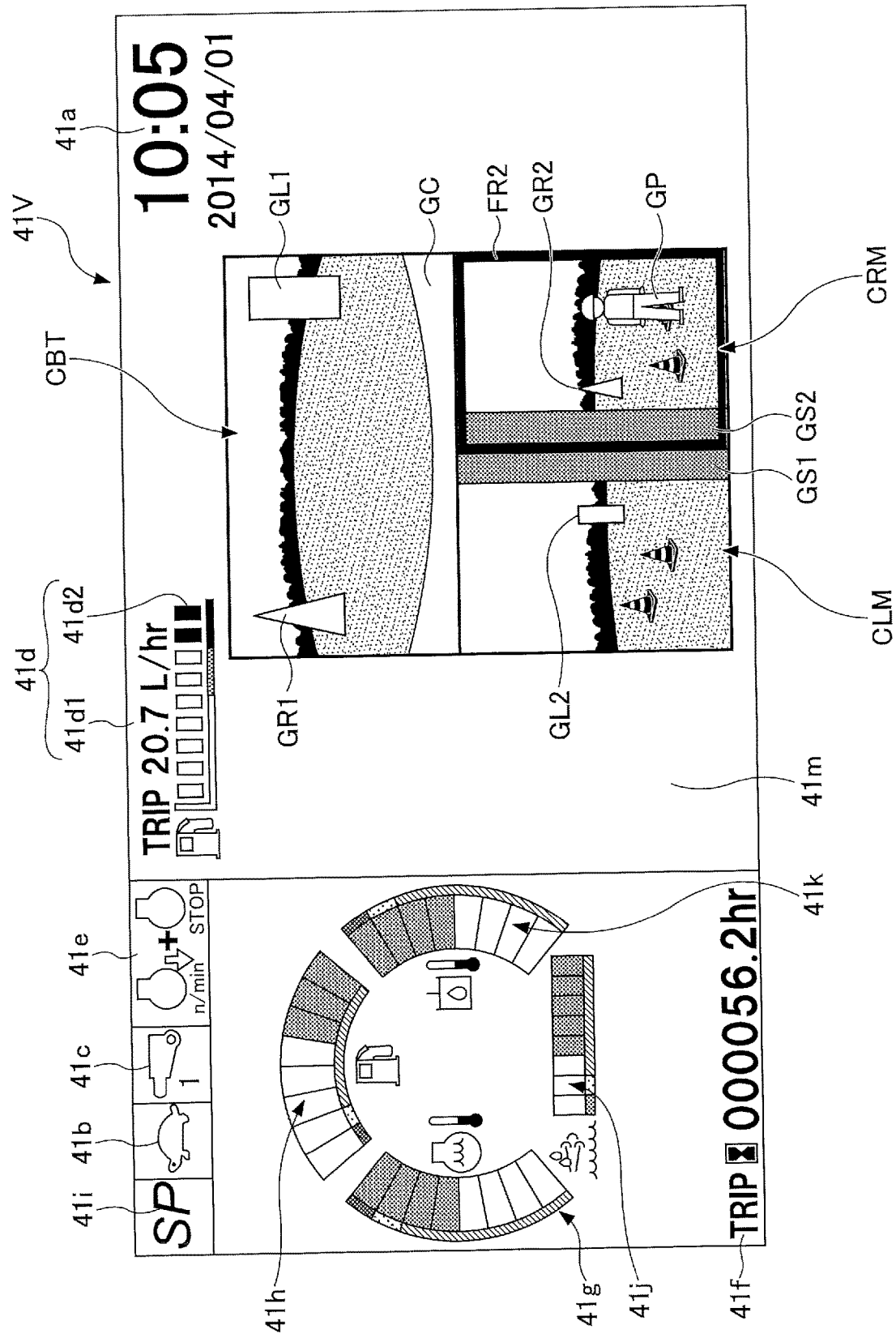
FIG. 10 is a diagram illustrating still another example configuration of the main screen.

FIGS. 9 and 10 illustrate example configurations of the main screen 41V displayed on the image display part 41 when the image capturing device 80 detects a person behind and to the right of the shovel 100.

The main screen 41V of FIG. 9 is different from the main screen 41V of FIG. 4 in that an image GP of a person is displayed in the right mirror image CRM and that an image of a frame (a frame image FR1) surrounding the image GP is displayed, but otherwise is equal to the main screen 41V of FIG. 4.

The main screen 41V of FIG. 10 is different from the main screen 41V of FIG. 9 in that an image of a frame (a frame image FR2) highlighting the outer edge of the right mirror image CRM is displayed, but otherwise is equal to the main screen 41V of FIG. 9. The frame image FR2 of FIG. 10 is larger than the frame image FR1 of FIG. 9.

The shovel 100 is configured to change the color of the frame image FR1 according to the distance between the shovel 100 and the detected person calculated based on the output of the object detector. Specifically, the shovel 100 causes the color of the frame image FR1 to be green when the distance is less than or equal to a first threshold, causes the color of the frame image FR1 to be yellow when the distance is less than or equal to a second threshold smaller than the first threshold, and causes the color of the frame image FR1 to be red when the distance is less than or equal to a third threshold smaller than the second threshold. The same applies to the frame image FR2.

According to this configuration, the shovel 100 can more reliably cause the operator of the shovel 100 to be aware of the presence of a person around the shovel 100.

An embodiment of the present invention is described in detail above. The present invention, however, is not limited to the above-described embodiment. Various variations, substitutions, etc., may be applied to the above-described embodiment without departing from the scope of the present invention. Furthermore, the separately described features may be suitably combined as long as no technical contradiction is caused.

For example, according to the above-described embodiment, the shovel 100 is configured to, when the image capturing device 80 detects a predetermined object, notify a person engaged in the work of the shovel 100 of the detection of the predetermined object using the alarm device 49. The shovel 100 may also be configured to have an automatic stop function to automatically stop the movement of the shovel 100 when the distance between the predetermined object detected by the image capturing device 80 and the shovel 100 is less than or equal to a fourth threshold.

Figure 11:
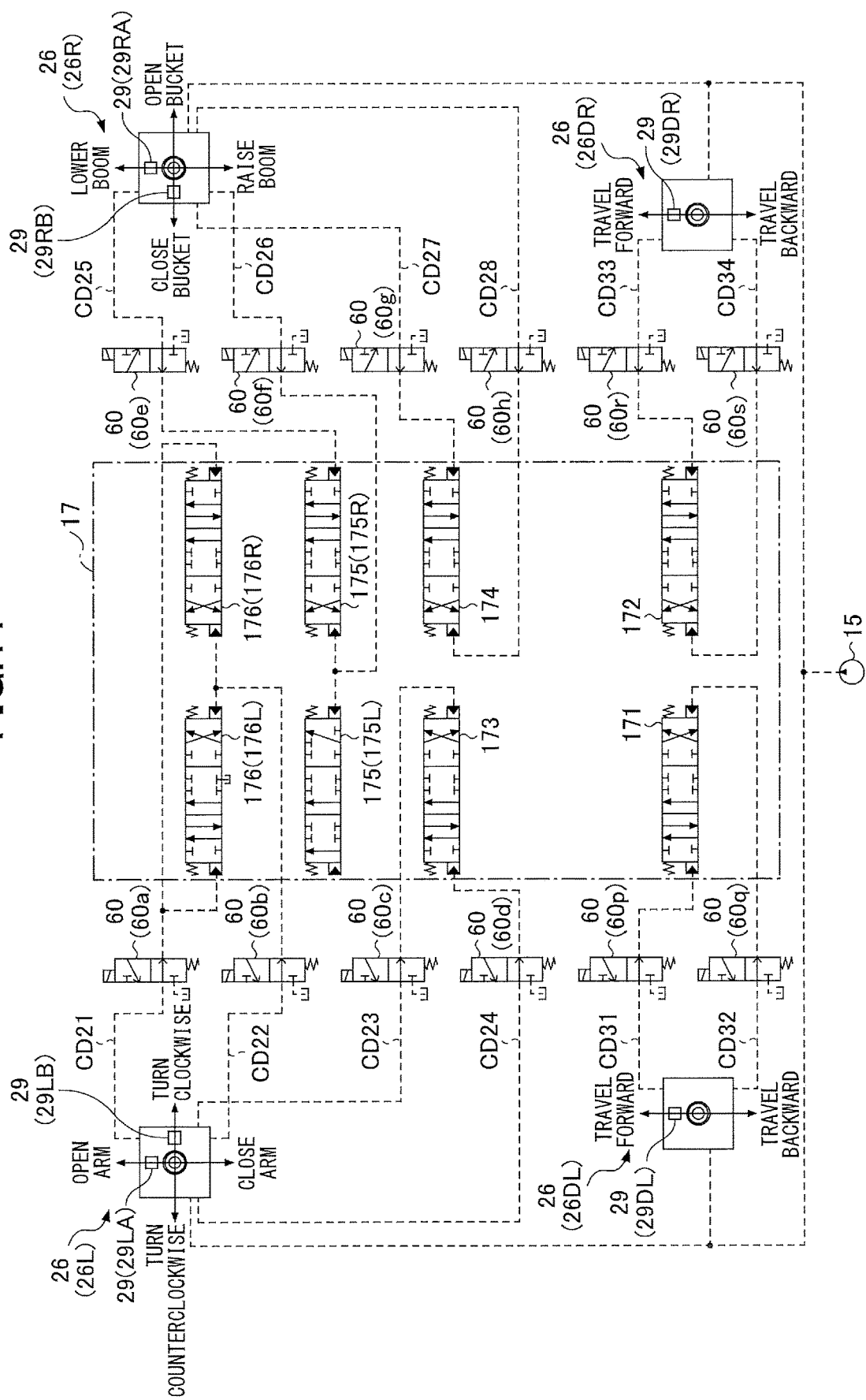
FIG. 11 is a diagram illustrating an example configuration of a hydraulic system installed in the shovel.

FIG. 11 illustrates an example configuration of a hydraulic system installed in the shovel 100 with the automatic stop function.

The hydraulic system of FIG. 11 is configured to be able to switch the open state and the closed state of pilot lines between the operating apparatus 26 and the respective pilot ports of control valves 171 through 176 included in the control valve 17 with a control valve 60.

The control valve 171 is a spool valve that switches the flow of hydraulic oil in order to supply hydraulic oil discharged by the main pump 14 to the left travel hydraulic motor 2ML and to discharge hydraulic oil discharged by the left travel hydraulic motor 2ML to the hydraulic oil tank.

The control valve 172 is a spool valve that switches the flow of hydraulic oil in order to supply hydraulic oil discharged by the main pump 14 to the right travel hydraulic motor 2MR and to discharge hydraulic oil discharged by the right travel hydraulic motor 2MR to the hydraulic oil tank.

The control valve 173 is a spool valve that switches the flow of hydraulic oil in order to supply hydraulic oil discharged by the main pump 14 to the turning hydraulic motor and to discharge hydraulic oil discharged by the turning hydraulic motor to the hydraulic oil tank.

The control valve 174 is a spool valve that switches the flow of hydraulic oil in order to supply hydraulic oil discharged by the main pump 14 to the bucket cylinder 9 and to discharge hydraulic oil in the bucket cylinder 9 to the hydraulic oil tank.

The control valve 175 is a spool valve that switches the flow of hydraulic oil in order to supply hydraulic oil discharged by the main pump 14 to the boom cylinder 7 and to discharge hydraulic oil in the boom cylinder 7 to the hydraulic oil tank. The control valve 175 includes a control valve 175L and a control valve 175R.

The control valve 176 is a spool valve that switches the flow of hydraulic oil in order to supply hydraulic oil discharged by the main pump 14 to the atm cylinder 8 and to discharge hydraulic oil in the atm cylinder 8 to the hydraulic oil tank. The control valve 176 includes a control valve 176L and a control valve 176R.

According to the example of FIG. 11, the operating apparatus 26 includes a left operating lever 26L, a right operating lever 26R, a left travel lever 26DL, and a right travel lever 26DR.

The left operating lever 26L is used for a turning operation and for operating the arm 5. When operated forward or backward, the left operating lever 26L introduces a control pressure commensurate with the amount of lever operation to a pilot port of the control valve 176, using hydraulic oil discharged by the pilot pump 15. When operated rightward or leftward, the left operating lever 26L introduces a control pressure commensurate with the amount of lever operation to a pilot port of the control valve 173, using hydraulic oil discharged by the pilot pump 15.

Specifically, when operated in an arm closing direction, the left operating lever 26L introduces hydraulic oil to the right pilot port of the control valve 176L and introduces hydraulic oil to the left pilot port of the control valve 176R. Furthermore, when operated in an arm opening direction, the left operating lever 26L introduces hydraulic oil to the left pilot port of the control valve 176L and introduces hydraulic oil to the right pilot port of the control valve 176R. Furthermore, when operated in a counterclockwise turning direction, the left operating lever 26L introduces hydraulic oil to the left pilot port of the control valve 173, and when operated in a clockwise turning direction, the left operating lever 26L introduces hydraulic oil to the right pilot port of the control valve 173.

The right operating lever 26R is used to operate the boom 4 and operate the bucket 6. When operated forward or backward, the right operating lever 26R introduces a control pressure commensurate with the amount of lever operation to a pilot port of the control valve 175, using hydraulic oil discharged by the pilot pump 15. When operated rightward or leftward, the right operating lever 26R introduces a control pressure commensurate with the amount of lever operation to a pilot port of the control valve 174, using hydraulic oil discharged by the pilot pump 15.

Specifically, when operated in a boom lowering direction, the right operating lever 26R introduces hydraulic oil to the right pilot port of the control valve 175R. Furthermore, when operated in a boom raising direction, the right operating lever 26R introduces hydraulic oil to the right pilot port of the control valve 175L and introduces hydraulic oil to the left pilot port of the control valve 175R. When operated in a bucket closing direction, the right operating lever 26R introduces hydraulic oil to the right pilot port of the control valve 174, and when operated in a bucket opening direction, the right operating lever 26R introduces hydraulic oil to the left pilot port of the control valve 174.

The left travel lever 26DL is used to operate the left crawler 1CL. The left travel lever 26DL may be configured to operate together with a left travel pedal. When operated forward or backward, the left travel lever 26DL introduces a control pressure commensurate with the amount of lever operation to a pilot port of the control valve 171, using hydraulic oil discharged by the pilot pump 15. The right travel lever 26DR is used to operate the right crawler 1CR.

The right travel lever 26DR may be configured to operate together with a right travel pedal. When operated forward or backward, the right travel lever 26DR introduces a control pressure commensurate with the amount of lever operation to a pilot port of the control valve 172, using hydraulic oil discharged by the pilot pump 15.

The operating pressure sensor 29 includes operating pressure sensors 29LA, 29LB, 29RA, 29RB, 29DL and 29DR. The operating pressure sensor 29LA detects the details of the operator's forward or backward operation of the left operating lever 26L in the form of pressure, and outputs the detected value to the controller 30. Examples of the details of operation include the direction of lever operation and the amount of lever operation (the angle of lever operation).

Likewise, the operating pressure sensor 29LB detects the details of the operator's rightward or leftward operation of the left operating lever 26L in the form of pressure, and outputs the detected value to the controller 30. The operating pressure sensor 29RA detects the details of the operator's forward or backward operation of the right operating lever 26R in the form of pressure, and outputs the detected value to the controller 30. The operating pressure sensor 29RB detects the details of the operator's rightward or leftward operation of the right operating lever 26R in the form of pressure, and outputs the detected value to the controller 30. The operating pressure sensor 29DL detects the details of the operator's forward or backward operation of the left travel lever 26DL in the form of pressure, and outputs, the detected value to the controller 30. The operating pressure sensor 29DR detects the details of the operator's forward or backward operation of the right travel lever 26DR in the form of pressure, and outputs the detected value to the controller 30.

The controller 30 receives the output of the operating pressure sensor 29, and outputs a control command to the regulator 14a to change the discharge quantity of the main pump 14 on an as-needed basis.

The control valve 60 is configured to switch the enabled state and the disabled state of the operating apparatus 26. According to the example of FIG. 11, the control valve 60 includes control valves 60a through 60h and 60p through 60s.

The control valve 60a is configured to switch the enabled state and the disabled state of a portion of the left operating lever 26L related to an arm opening operation. According to this embodiment, the control valve 60a is a solenoid valve that can switch the open state and the closed state of a pilot line CD21 connecting the arm opening operation-related portion of the left operating lever 26L to the left pilot port of the control valve 176L and the right pilot port of the control valve 176R. Specifically, the control valve 60a is configured to switch the open state and the closed state of the pilot line CD21 in response to a command from the controller 30.

The control valve 60b is a solenoid valve that can switch the open state and the closed state of a pilot line CD22 connecting a portion of the left operating lever 26L related to an arm closing operation to the right pilot port of the control valve 176L and the left pilot port of the control valve 176R. Specifically, the control valve 60b is configured to switch the open state and the closed state of the pilot line CD22 in response to a command from the controller 30.

The control valve 60c is a solenoid valve that can switch the open state and the closed state of a pilot line CD23 connecting a portion of the left operating lever 26L related to a clockwise turning operation and the right pilot port of the control valve 173. Specifically, the control valve 60c is configured to switch the open state and the closed state of the pilot line CD23 in response to a command from the controller 30.

The control valve 60d is a solenoid valve that can switch the open state and the closed state of a pilot line CD24 connecting a portion of the left operating lever 26L related to a counterclockwise turning operation and the left pilot port of the control valve 173. Specifically, the control valve 60d is configured to switch the open state and the closed state of the pilot line CD24 in response to a command from the controller 30.

The control valve 60e is a solenoid valve that can switch the open state and the closed state of a pilot line CD25 connecting a portion of the right operating lever 26R related to a boom lowering operation and the right pilot port of the control valve 175R. Specifically, the control valve 60e is configured to switch the open state and the closed state of the pilot line CD25 in response to a command from the controller 30.

The control valve 60f is a solenoid valve that can switch the open state and the closed state of a pilot line CD26 connecting a portion of the right operating lever 26R related to a boom raising operation to the right pilot port of the control valve 175L and the left pilot port of the control valve 175R. Specifically, the control valve 60f is configured to switch the open state and the closed state of the pilot line CD26 in response to a command from the controller 30.

The control valve 60g is a solenoid valve that can switch the open state and the closed state of a pilot line CD27 connecting a portion of the right operating lever 26R related to a bucket closing operation and the right pilot port of the control valve 174. Specifically, the control valve 60g is configured to switch the open state and the closed state of the pilot line CD27 in response to a command from the controller 30.

The control valve 60h is a solenoid valve that can switch the open state and the closed state of a pilot line CD28 connecting a portion of the right operating lever 26R related to a bucket opening operation and the left pilot port of the control valve 174. Specifically, the control valve 60h is configured to switch the open state and the closed state of the pilot line CD28 in response to a command from the controller 30.

The control valve 60p is a solenoid valve that can switch the open state and the closed state of a pilot line CD31 connecting a portion of the left travel lever 26DL related to a forward travel operation and the left pilot port of the control valve 171. Specifically, the control valve 60p is configured to switch the open state and the closed state of the pilot line CD31 in response to a command from the controller 30.

The control valve 60q is a solenoid valve that can switch the open state and the closed state of a pilot line CD32 connecting a portion of the left travel lever 26DL related to a backward travel operation and the right pilot port of the control valve 171. Specifically, the control valve 60q is configured to switch the open state and the closed state of the pilot line CD32 in response to a command from the controller 30.

The control valve 60r is a solenoid valve that can switch the open state and the closed state of a pilot line CD33 connecting a portion of the right travel lever 26DR related to a forward travel operation and the right pilot port of the control valve 172. Specifically, the control valve 60r is configured to switch the open state and the closed state of the pilot line CD33 in response to a command from the controller 30.

The control valve 60s is a solenoid valve that can switch the open state and the closed state of a pilot line CD34 connecting a portion of the right travel lever 26DR related to a backward travel operation and the left pilot port of the control valve 172. Specifically, the control valve 60s is configured to switch the open state and the closed state of the pilot line CD34 in response to a command from the controller 30.

According to this configuration, the controller 30 can switch the enabled state and the disabled state of each of the boom raising operation-related portion, the boom lowering operation-related portion, the arm closing operation-related portion, the arm opening operation-related portion, the bucket closing operation-related portion, the bucket opening operation-related portion, the counterclockwise turning operation-related portion, the clockwise turning operation-related portion, the forward travel operation-related portion, and the backward travel operation-related portion of the operating apparatus 26, independent of each other.

The controller 30 may switch part or the entirety of the operating apparatus 26 to the disabled state when the distance between a predetermined object detected by the image capturing device 80 and the shovel 100 is less than or equal to the fourth threshold, for example.

What is claimed is:

1. A shovel comprising:
   a lower traveling body;
   an upper turning body turnably mounted on the lower traveling body;
   a cab installed on the upper turning body;
   a display device installed in the cab; and
   a plurality of image capturing devices attached to the upper turning body,
   wherein the display device is configured to simultaneously display a left mirror image and a right mirror image each generated based on an image captured by at least one of the plurality of image capturing devices,
   the left mirror image is an image corresponding to a mirror image in a left mirror attached to a left front end of the upper turning body and showing an area behind the upper turning body from the left front end of the upper turning body, and
   the right mirror image is an image corresponding to a mirror image in a right mirror attached to a right front end of the upper turning body and showing an area behind the upper turning body from the right front end of the upper turning body.

2. The shovel as claimed in claim 1, wherein the display device is further configured to simultaneously display the left mirror image, the right mirror image, and a rearward image.

3. The shovel as claimed in claim 1, wherein the display device is further configured to switch between a mode of simultaneously displaying the left mirror image and the right mirror image and a mode of displaying an overhead view image as a virtual viewpoint image generated based on a plurality of images captured by the plurality of image capturing devices.

4. The shovel as claimed in claim 3, wherein the display device is further configured to simultaneously display the overhead view image and a rearward image.

5. The shovel as claimed in claim 1, wherein the plurality of image capturing devices include a left camera that is behind the cab and attached to a left end of the upper turning body and a right camera that is behind the cab and attached to a right end of the upper turning body.

6. The shovel as claimed in claim 5, wherein
the left mirror image is generated based on at least an image captured by the left camera, and
the right mirror image is generated based on at least an image captured by the right camera.

7. The shovel as claimed in claim 5, wherein
the plurality of image capturing devices further include a back camera that is behind the cab and attached to a back end of the upper turning body,
the left mirror image is generated based on at least an image captured by the left camera and an image captured by the back camera, and
the right mirror image is generated based on at least an image captured by the right camera and the image captured by the back camera.

8. The shovel as claimed in claim 1, wherein the plurality of image capturing devices include a left camera attached to the left front end of the upper turning body and a right camera attached to the right front end of the upper turning body.

9. The shovel as claimed in claim 1, wherein the display device is further configured to simultaneously display the left mirror image, the right mirror image, settings information of the shovel, and operating condition information of the shovel.

10. The shovel as claimed in claim 1, further comprising:
an object detector configured to detect an object in an area surrounding the upper turning body,
wherein the display device is further configured to superimpose and display a particular image over a position on a displayed image, the position corresponding to an actual position of the object detected by the object detector, in such a manner as to enable the actual position of the detected object to be identified.

11. The shovel as claimed in claim 10, wherein a color or a light and shade of the particular image changes according to a distance between the detected object and the object detector.

12. A display device for a shovel, wherein
the display device is configured to simultaneously display a left mirror image and a right mirror image each generated based on an image captured by at least one of a plurality of image capturing devices attached to an upper turning body of the shovel,
the left mirror image is an image corresponding to a mirror image in a left mirror attached to a left front end of the upper turning body and showing an area behind the upper turning body from the left front end of the upper turning body, and
the right mirror image is an image corresponding to a mirror image in a right mirror attached to a right front end of the upper turning body and showing an area behind the upper turning body from the right front end of the upper turning body.

* * * * *